US012542704B2

(12) United States Patent
Liu et al.

(10) Patent No.: US 12,542,704 B2
(45) Date of Patent: Feb. 3, 2026

(54) TRANSMITTER AND RECEIVER FOR, AND METHOD OF, TRANSMITTING AND RECEIVING SYMBOLS OVER TIME VARYING CHANNELS WITH DOPPLER SPREAD

(71) Applicants: Continental Automotive Technologies GmbH, Hannover (DE); NANYANG TECHNOLOGICAL UNIVERSITY, Singapore (SG)

(72) Inventors: Yujie Liu, Singapore (SG); Yong Liang Guan, Singapore (SG); David González González, Hannover (DE)

(73) Assignees: CONTINENTAL AUTOMOTIVE TECHNOLOGIES GMBH, Hannover (DE); NANYANG TECHNOLOGIAL UNIVERSITY, Singapore (SG)

( * ) Notice: Subject to any disclaimer, the term of this patent is extended or adjusted under 35 U.S.C. 154(b) by 0 days.

(21) Appl. No.: 19/091,239

(22) Filed: Mar. 26, 2025

(65) Prior Publication Data
US 2025/0233787 A1 Jul. 17, 2025

Related U.S. Application Data

(63) Continuation of application No. PCT/IB2023/060501, filed on Oct. 18, 2023.

(30) Foreign Application Priority Data

Oct. 21, 2022 (DE) .................. 102022127946.4

(51) Int. Cl.
H04L 27/26 (2006.01)
H04B 7/01 (2006.01)
H04L 5/00 (2006.01)

(52) U.S. Cl.
CPC ........ *H04L 27/2639* (2013.01); *H04L 5/0023* (2013.01); *H04L 5/0048* (2013.01);
(Continued)

(58) Field of Classification Search
CPC ... H04L 5/0023; H04L 5/0048; H04L 27/261; H04L 27/2639
See application file for complete search history.

(56) References Cited

U.S. PATENT DOCUMENTS

2020/0322185 A1 10/2020 Kons et al.
2020/0389268 A1* 12/2020 Sathyanarayan ...........................
H04L 27/26532

(Continued)

FOREIGN PATENT DOCUMENTS

DE 102021126321 A1 12/2022
DE 102022106409 A1 4/2023
EP 3761583 A1 1/2021

OTHER PUBLICATIONS

German Office Action with English translation issued in corresponding Patent Application No. 10 2022 125 445.3 dated Jun. 30, 2023, 6 pages.

(Continued)

Primary Examiner — David B Lugo
(74) Attorney, Agent, or Firm — Buchanan Ingersoll & Rooney PC

(57) ABSTRACT

A communication frame for an OTFS transmission system includes at least one first-type and at least one second-type block. At least the first-type block includes data signals two-dimensionally arranged along the delay domain and the Doppler domain of which at least one has a superimposed pilot signal. The second-type block includes data signals two-dimensionally arranged along the delay domain and the Doppler domain which may or may not have superimposed pilot signals. At least one second-type block is preceded and (Continued)

followed, in the delay-domain, by first-type blocks, the first-type blocks preceding and following a second-type block having at least one identical data symbol and associated superimposed identical pilot symbol at an identical location in the two-dimensional arrangement. An OTFS transmitter generates and transmits the communication frame, and a receiver uses its properties for compensating oscillator frequency offset and channel estimation.

18 Claims, 7 Drawing Sheets

(52) U.S. Cl.
CPC ...... *H04L 27/261* (2013.01); *H04L 27/26532* (2021.01); *H04B 7/01* (2013.01)

(56) References Cited

U.S. PATENT DOCUMENTS

| | | | |
|---|---|---|---|
| 2021/0112527 A1* | 4/2021 | Pfadler | ................ H04W 72/04 |
| 2022/0158780 A1 | 5/2022 | Namboodiri et al. | |
| 2022/0385508 A1 | 12/2022 | Pfadler et al. | |
| 2022/0393921 A1 | 12/2022 | Pfadler et al. | |
| 2023/0208575 A1* | 6/2023 | Yuan | ................ H04L 5/0005 370/329 |
| 2023/0318894 A1* | 10/2023 | Yuan | ................ H04L 27/2639 |
| 2024/0250858 A1 | 7/2024 | Liu et al. | |
| 2024/0267275 A1* | 8/2024 | Wang | ................ H04L 27/2605 |
| 2025/0055738 A1 | 2/2025 | Liu et al. | |

OTHER PUBLICATIONS

German Office Action with English translation issued in corresponding Patent Application No. 10 2022 127 946.4 dated Jun. 30, 2023. (7 pages).
International Search Report (PCT/ISA/210) and Written Opinion (PCT/ISA/237) mailed on Feb. 5, 2024, by the European Patent Office as the International Searching Authority for International Application No. PCT/IB2023/060501. (14 pages).
International Search Report (PCT/ISA/210) and Written Opinion (PCT/ISA/237) mailed on Jan. 5, 2024, by the European Patent Office as the International Searching Authority for International Application No. PCT/IB2023/059741, 9 pages.
Liu et al., "A Novel Dual-Rate OTFS System Resilient to OFO and Doppler Spread", IEEE International Conference on Communications (ICC): Signal Processing for Communications Symposium, May 28, 2023, pp. 1313-1318.
Liu et al., "Near-Optimal BEM OTFS Receiver With Low Pilot Overhead for High-Mobility Communications", IEEE Transactions on Communications, vol. 70, No. 5, May 2022, pp. 3392-3406.
Mishra et al., "OTFS Channel Estimation And Data Detection Designs With Superimposed Pilots", arXiv.org, Cornell University Library, 201 201 Olin Library at Cornell University in Ithaca, NY 14853, Oct. 28, 2020, XP081801129. (30 pages).
Raviteja et al., "Embedded Delay-Doppler Channel Estimation for Orthogonal Time Frequency Space Modulation", Proceedings of the IEEE 88th Vehicular Technology Conference, Jun. 20, 2023, 5 pages.
Yuan et al., "Integrated Sensing and Communication-Assisted Orthogonal Time Frequency Space Transmission for Vehicular Networks", IEEE Journal of Selected Topics n Signal Processing, vol. 15, No. 6, Nov. 2021, pp. 1515-1528.
Zhao et al., "Orthogonal Time Frequency Space (OTFS) With Dual-Mode Index Modulation", IEEE Wireless Communications Letters, (May 2021), vol. 10, No. 5, pp. 991-995.
Office Action issued by the U.S. Patent and Trademark Office in the U.S. Patent Application No. 19/091,125, mailed May 20, 2025, U.S. Patent and Trademark Office, Alexandria, VA. (16 pages).
Office Action issued by the U.S. Patent and Trademark Office in the U.S. Appl. No. 19/112,424, mailed May 23, 2025, U.S. Patent and Trademark Office, Alexandria, VA. (15 pages).
Office Action issued by the U.S. Patent and Trademark Office in the U.S. Appl. No. 19/112,108, mailed May 28, 2025, U.S. Patent and Trademark Office, Alexandria, VA. (9 pages).
Notice of Allowance issued by the U.S. Patent and Trademark Office in the U.S. Appl. No. 19/112,108, mailed Oct. 10, 2025, U.S. Patent and Trademark Office, Alexandria, VA. (7 pages).

* cited by examiner

TRANSMITTER AND RECEIVER FOR, AND METHOD OF, TRANSMITTING AND RECEIVING SYMBOLS OVER TIME VARYING CHANNELS WITH DOPPLER SPREAD

CROSS REFERENCE TO RELATED APPLICATIONS

This application is a continuation of International Application No. PCT/IB2023/060501, filed Oct. 18, 2023, which claims priority to German Patent Application No. 10 2022 127 946.4, filed Oct. 21, 2022, the contents of such applications being incorporated by reference herein.

FIELD OF THE INVENTION

The present invention relates to a method of transmitting and receiving symbols over an orthogonal time frequency space (OTFS) communication channel subject to Doppler spread and a transmitter and receiver implementing the method.

Definitions

Throughout this specification, bold symbols represent vectors or matrices. Superscripts T, H and †, respectively denote the transpose, complex conjugate transpose and pseudo inverse of a vector or matrix. diag $\{a\}$ is a diagonal matrix with vector a on its diagonal, while diag $\{A\}$ is a vector whose elements are from the diagonal of matrix A. $\otimes$ is the Kronecker product.

BACKGROUND OF THE INVENTION

The sixth generation (6G) wireless communications and beyond are expected to serve a large number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalisers. However, due to speed-dependent Doppler shifts or spreads and quickly varying multipath reception, high-mobility communications suffer from severe time and frequency dispersiveness. Time and frequency dispersiveness each cause signal fading at the receiver, and the fading is thus also referred to as doubly selective channel fading. Doubly selective channel fading significantly impairs the performance of OFDM communication.

As an alternative to OFDM, OTFS modulation was proposed as a solution for coping with doubly selective fading channels.

OTFS modulation is a 2D modulation scheme that multiplexes information QAM symbols over carrier waveforms that correspond to localized pulses in a signal representation that is referred to as delay-Doppler representation. The OTFS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission.

FIG. 1 shows a block diagram of a general OTFS transmission system. A transmitter 200 comprises a first transmitter-side transformation unit 202 and a second transmitter-side transformation unit 204. Serial binary data is input to a signal mapper (not shown in the figure) that outputs a two-dimensional sequence of information symbols x[k, l] in which the QAM symbols are arranged along the delay period and the Doppler period of the delay-Doppler domain.

The use of the delay-Doppler channel representation is beneficial due to its compactness and sparsity. Since typically there is only a small number of physical reflectors with associated reflected signals, far fewer parameters are needed for channel modelling and estimation in the delay-Doppler domain than in the time-frequency domain.

The two-dimensional sequence of information symbols x[k, l] is input to the first transmitter-side transformation unit 202 and is subjected to an inverse Finite Symplectic Fourier Transformation (ISFFT), which produces a matrix X[n, m] that represents the two-dimensional sequence of information symbols x[k, l] in the time-frequency domain. As the transmitter transmits in the time domain, a further transformation in the second transmitter-side transformation unit 204 is required, which produces the signal s[t] in the time domain, e.g., a Heisenberg transformation. The signal s[t] is then transmitted via an antenna 206 over the communication channel.

In a realistic environment the transmitted signal, on its way from the transmitter through the communication channel to the receiver, is subject to doubly selective fading with Doppler spread. The received signal is a superposition of a direct copy and a plurality of reflected copies of the transmitted signal, where each copy is delayed by a path delay that is dependent from the length of the signal's path delay and is frequency shifted by the Doppler shift that depends from the differential speed between transmitter, reflector, and receiver. Each of the signal copies is weighted in accordance with its particular path delay and differential speed. Typical Doppler shifts are on the order of 10 Hz-1 kHz, though larger values may occur in scenarios with extremely high mobility (e.g., high-speed trains) and/or high carrier frequency. As in realistic environments it is very likely that multiple reflectors and/or moving reflectors are present, the received superimposed signal is spread out over a frequency range rather than merely shifted in frequency, and the signal deformation is thus also referred to as Doppler spread. In the following description the realistic communication channel is also referred to as practical communication channel.

In FIG. 1 the practical communication channel is represented by the undisturbed radio waves emitted from the transmitter antenna 206 and the various unordered radio waves coming from different directions and with different distances to each other at the receiver antenna 302. The radio waves may arrive at the receiver's antenna directly or after being reflected one or several times at one or more stationary and/or moving objects, which may introduce Doppler shift and different delays to the reflected radio waves.

The receiver 300 picks up the received signal r[t] in the time domain, which is provided to a first receiver-side transformation unit 304, in which it is subjected to a Wigner transform for transforming the received signal r[t] into a matrix Y[n, m] representing the received signal r[t] in the time-frequency domain. For enabling signal detection in the delay-Doppler domain the matrix Y[n, m] is then provided to a second receiver-side transformation unit 306, where it is subjected to a Finite Symplectic Fourier Transformation (SFFT), which outputs a two-dimensional sequence of information symbols y[k, l] in the delay-Doppler domain. The two-dimensional sequence of information symbols y[k, l] is input to a channel estimation and equalisation block 310, which performs channel estimation CE and signal detection SD and reconstructs the symbols that were originally transmitted, and ultimately to a de-mapper that outputs the binary data that was originally transmitted (de-mapper not shown in the figure).

In order to enable channel estimation in the receiver, pilots may be added at the transmitter. These pilots, that are known beforehand at the receiver, are located at known positions within the two-dimensional sequence of information symbols that is ultimately transmitted. However, the pilots taking the place of data symbols, but not carrying any data, reduce the spectral efficiency of the system.

Some known OTFS receivers make use of the properties of the delay-Doppler channel representation and apply a basis expansion model (BEM) for parameterizing the time varying channel as a weighted combination of a number of basis functions in OTFS, making use of the fact that BEM can help reducing the number of unknown channel coefficients to be estimated.

BEM has numerous kinds, including complex exponential BEM (CE-BEM), generalized CE-BEM (GCE-BEM), non-critically sampled CE-BEM (NCS-CE-BEM), polynomial BEM, discrete prolate spheroidal (DPS) BEM, Karhunen-Loeve BEM (KL-BEM), spatial-temporal BEM, etc.

Among them, CE-BEM is the simplest model which, however, suffers a significant modelling error. On the positive side, CE-BEM and its variants GCE-BEM and NCS-CE-BEM are independent on the channel statistics. GCE-BEM enjoys simplicity and analytical tractability. Its BEM order should be greater than 1 at least, i.e., T≥2, for approaching near-optimal performance, where T is the modelling resolution parameter. Specifically, the GCE-BEM with T=1 suffers from a rather big modelling error, while the counterpart with T>1 enjoys low modelling error, albeit at the expense of large BEM order and high complexity.

In known OTFS receivers using complex exponential basis expansion modelling channel estimation, the pilot overhead, in order to achieve acceptable performance, must be increased with increasing maximum channel delay and Doppler spread, reducing the spectral efficiency. While many OTFS channels may have a known maximum channel delay and possibly also maximum known Doppler spread, real-life systems will be designed for even higher maximum delay and Doppler spread, for providing some safety margin. This will further reduce the spectral efficiency in such practical systems.

An improvement of the spectral efficiency can be achieved by using superimposed pilots (SP) and using the freed-up space for data symbols. Superimposed pilots employ low-powered pilots that are superimposed on data symbols in the delay-Doppler domain. The data symbols and the pilots superimposed thereon are transformed into the OTFS signal vector x that is ultimately transmitted after further transformations.

FIG. 2 shows a general illustration of superimposed pilots in a transmission frame. As is shown in the left part of FIG. 2, the pilots may be arranged across the entire plane of the two-dimensional sequence of information symbols, which information symbols are arranged along the delay period and the Doppler period of the delay-Doppler domain.

The pilots, which have a much lower power than the information symbols, are represented by the ordered checkerboard pattern, indicating the fact that the pilots are known beforehand at the receiver. The data is represented by the random pattern, indicating the variable nature of the data that is transmitted. The power allocation is indicated by the distance from the delay-Doppler plane. The right part of FIG. 2 shows an exemplary power allocation to pilots and data symbols. It is easy to see that the pilots have a much lower power than the data.

In realistic scenarios, there is a constraint for the transmission power which covers both data and pilot transmission, i.e., data symbols and pilots share the total transmission power available to the transmitter.

In the following sections M and N represent the dimensions of the transmission frame in the delay grid and the Doppler grid, respectively, in which the symbols are arranged. The transmitted complex OTFS vector x can be represented as a superimposed pilot vector $x_{sp}$ and a data vector $x_d$, in the delay-Doppler domain, which are defined as $$x_{sp} = [x_{sp}[0, 0], x_{sp}[0, 1], \ldots, x_{sp}[0, M-1], \ldots, x_{sp}[N-1, 0],$$
$$x_{sp}[N-1, 1], \ldots, x_{sp}[N-1, M-1]]^T,$$

and $$x_d = [x_d[0, 0], x_d[0, 1], \ldots, x_d[0, M-1], \ldots, x_d[N-1, 0],$$
$$x_d[N-1, 1], \ldots, x_d[N-1, M-1]]^T$$

Defining $P_T$ as the total transmission power and $\alpha$ ($\alpha \in (0, 1)$) as the pilot power allocation ratio, $\alpha P_T$ and $(1-\alpha)P_T$ are used for transmitting pilots and data symbols, respectively. As a result, the transmitted OTFS signal vector x can be expressed as $$x = \sqrt{\alpha}\, x_{sp} + \sqrt{1-\alpha}\, x_d.$$

Typically, if more power is used for pilot transmission, i.e., $\alpha$ is large, the channel estimation performance can be expected to be better. However, less power would remain for data transmission, giving rise to low data signal-to-noise-ratio (SNR) and thus low reliability. Instead, the pilots allocated with less power, i.e., $\alpha$ is small, would lead to a poor channel estimate and signal estimate. Therefore, a suitable power allocation between data and pilots is of utter importance in achieving high reliability.

The received signal vector y in the delay-Doppler domain can be written as $$y = \sqrt{\alpha} \sum_{q=0}^{Q} (F_N \otimes I_M) \text{diag}\{b_{BEM,q}\} F_{MN}^H \text{diag}$$
$$\{F_{MN \times L} c_q\} F_{MN}(F_N^H \otimes I_M) x_{sp} + \sqrt{1-\alpha} \sum_{q=0}^{Q} (F_N \otimes I_M) \text{diag}\{b_{BEM,q}\}$$
$$F_{MN}^H \text{diag}\{F_{MN \times L} c_q\} F_{MN}(F_N^H \otimes I_M) x_d + w + z$$

where $b_{BEM,q}$ and $c_q$ are respectively the q-th BEM basis function and coefficient, $Q$ denotes the BEM order which relates to $f_D$, $F_{MN}$ is the discrete Fourier transform (DFT) matrix, w is the additive white Gaussian noise vector, and z is the error to the received OTFS signal incurred by BEM modelling. It is noteworthy that the previous equation is equivalent to $$y = \sqrt{\alpha} \sum_{q=0}^{Q}(F_N \otimes I_M)\text{diag}\{b_{BEM,q}\}F_{MN}^H \text{diag}$$

$$\{F_{MN}(F_N^H \otimes I_M)x_{sp}\}F_{MN \times L}c_q + \sqrt{1-\alpha}\sum_{q=0}^{Q}(F_N \otimes I_M)\text{diag}\{b_{BEM,q}\}$$

$$F_{MN}^H \text{diag}\{F_{MN}(F_N^H \otimes I_M)x_d\}F_{MN \times L}c_q + w + z$$

The representation of the received signal vector y as a combination of a vector $y_d$ representing the data and a vector $y_{sp}$ representing the superimposed pilots, plus noise and error, permits treating the data symbols as interference for the channel estimation. As opposed to the pilot signals, data signals may have a high variability and may appear to have a rather random nature, which could be further emphasised using a suitable arrangement of the data symbols in the two-dimensional OTFS transmission frame, in case repetitive structures are present in the data signals.

Now, while the superiority of OFTS modulation under ideal conditions is undisputed, practical limitations in cost-effective applications thereof can present obstacles for its wide adaptation, inter alia, carrier frequency offset (CFO).

CFO is the carrier frequency mismatch between transmitter and receiver, which is caused by the Doppler effect and radio frequency (RF) device components. The CFO caused by the Doppler effect is typically referred to as Doppler shift or Doppler spread, while the CFO caused by local crystal oscillators (XOs) is known as oscillator frequency offset (OFO).

There are three main types of crystal oscillators, namely free-running XO, temperature-controlled XO (TCXO), and oven-controlled XO (OCXO). Free-running XO are the cheapest but suffer from the largest frequency error, for instance, between ±10 and ±20 ppm, where ppm denotes parts per million. OCXO can reduce the frequency error to 0.0015 ppm, while incurring very high equipment cost of up to 2000 times that of a free-running XO and also incurring increased power cost. TCXO are a good trade-off between free-running XO and OCXO. It is much less expensive than OCXO, about five times the cost, and the frequency error can be reduced to ±1.5 ppm.

The OFO is typically much bigger than the Doppler shift or spread. For example, when the carrier frequency is 4 GHZ, a TCXO with a frequency error ±1.5 ppm may result in an OFO of ±6 kHz, which is more significant than the Doppler frequency shift of 0.5 to 2 KHz for velocities between 125 to 500 km/h. It is noted that the Doppler frequency shift is added to the OFO, further increasing the maximum doppler frequency shift at a receiver.

It is, therefore, desirable to optimize the performance of an OTFS communication system with respect to spectral efficiency, performance and reliability in the presence of OFO and Doppler spread.

SUMMARY OF THE INVENTION

This is addressed by an aspect of the present invention as defined in the appended claims, which propose, inter alia, a communication frame with dual-rate data that permits estimating and compensating large OFO, e.g., larger than 0.5 ppm, in OTFS receivers, in particular in OTFS transmissions having otherwise low pilot overhead and high spectral efficiency. The expression dual-rate refers to blocks of the communication frame having low-rate data and high-rate data, the former being particularly useful for in-band signalling in the control and user planes. In-band signalling may be used for transmitting both UE-specific control information and common control information. Other claims defining aspects of the present invention relate to a time-frequency distortion resilient OTFS (TFDR-OTFS) transmitter and a corresponding receiver of an OTFS transmission system, for transmitting and receiving, respectively, binary data sequences in communication frames in accordance with an aspect of the invention, for high-mobility communication over OTFS communication channels having long delay spread and large Doppler spread, in the presence of OFO. Yet other claims defining aspects of the present invention relate to methods of transmitting and receiving, respectively, data symbols, the receiving method including estimating and compensating OFO in an OTFS receiver using the proposed dual-rate data communication frame. Yet further claims defining aspects of the invention relate to a wireless device for an OTFS transmission system incorporating a proposed receiver and/or a transmitter, and computer program products. Advantageous embodiments and developments are provided in the respective dependent claims.

In the following section, an analytical OTFS system model considering OFO will be presented, before a communication frame for an OTFS transmission system for use in the inventive methods, transmitter and receiver is proposed, and finally the proposed TFDR-OTFS receiver with dual-rate data and SP will be discussed in detail.

From the various kinds of BEM introduced further above, KL-BEM with a good knowledge of channel statistics is considered the most accurate BEM model. However, its performance is suboptimal when the assumed channel properties differ from the real channel, and is likewise suboptimal in the presence of residual OFO remaining after OFO estimation and compensation. Thus, an aspect of the present invention relies on GCE-BEM rather than KL-BEM. An aspect of the present invention further uses superimposed pilots for an initial channel estimation and detected symbols as additional pseudo pilots in repeated iterative channel estimations. Superimposing pilots may be used only for portions of a communication frame, or for the entire communication frame. The particular construction of the communication frame using first-type blocks and second-type blocks permits OFO estimation in the receiver.

Like in the OTFS system model discussed further above, in the OTFS system model with OFO included, M and N represent the dimensions of the transmission frame within the delay grid and the Doppler grid, respectively, in which the symbols are arranged. As the observations for OFO equally apply to both dedicated pilots and superimposed pilots, the following discussion uses a general representation of the OTFS signal vectors. The transmitted complex OTFS matrix x is defined as $$x = [x[0, 0], x[0, 1], \ldots, x[0, M-1], \ldots, x[N-1, 0],$$

$$x[N-1, 1], \ldots, x[N-1, M-1]]^T$$

and the received OTFS matrix y in the delay-Doppler domain is defined as $$y = [y[0, 0], y[0, 1], \ldots, y[0, M-1], \ldots, y[N-1, 0],$$

$$y[N-1, 1], \ldots, y[N-1, M-1]]^T$$

$H_t$ is the MN×MN time varying channel matrix in the time domain, where Jakes' model is considered and the maximum Doppler frequency is denoted as $f_D$. Define $\phi$ ($\phi \in [-e_{ofo}, e_{ofo}]$) as the OFO, where $e_{ofo}$ is the largest frequency error of the XO in units of ppm. The received OTFS signal vector y in the presence of OFO can be written as, $$y = (F_N \otimes I_M)E(\phi)H_t(F_N^H \otimes I_M)x + w,$$

where $E(\Phi) = \text{diag}\left\{\left[1, e^{\frac{j2\pi\phi}{M}}, \ldots, e^{\frac{j2\pi\phi(MN-1)}{M}}\right]^T\right\}$ is the OFO matrix, $F_N$ the DFT matrix, $I_M$ the M×M identity matrix, and w the additive white Gaussian noise vector. By adopting GCE-BEM to the channel model $H_t$, e.g., as presented in German patent publication DE 10 2022 106 409 A1, the entirety of its content being incorporated herein by reference, y is further represented by $$y = \sum_{q=0}^{Q}(F_N \otimes I_M)E(\phi) \text{diag}\{b_q\}F_{MN}^H \text{diag}\{F_{MN \times L}c_q\}F_{MN}(F_N^H \otimes I_M)x + z_{mod} + w$$

where $b_q$ and $c_q$ are respectively the q-th GCE-BEM basis function and coefficient, $Q$ denotes the GCE-BEM order which relates to $f_D$, $F_{MN}$ is the DFT matrix, and $z_{mod}$ is the GCE-BEM modelling error.

In the following, the element-wise input-output relation between x[k, l] and y[k, l] is derived by considering GCE-BEM with its BEM resolution being 1. At the transmitter, after applying an iSFFT and Heisenberg transform, the time-domain symbols s[n, m] are written as $$s[n, m] = \sum_{k=0}^{N-1} x[k, m]e^{j2\pi\frac{nk}{N}}.$$

Define h[t, l'] as the channel gain of the l'-th path (l'=0, 1, ..., L) at the t-th (t=0, 1, ..., MN−1) time instant, where L denotes the channel length. After propagating through the doubly selective fading channel, the received time-domain symbols r[n, l] are formulated as $$r[n, l] = e^{\frac{j2\pi\phi(nM+l)}{M}} \sum_{q=0}^{Q}\sum_{l'=0}^{L} h[nM+l, l']s[n, l-l']$$

$$= e^{\frac{j2\pi\phi(nM+l)}{M}} \sum_{q=0}^{Q}\sum_{l'=0}^{L}\sum_{k'=0}^{N-1} c_q[l']x[k', l-l']e^{j2\pi q'\frac{nM+l}{MN}}e^{j2\pi\frac{nk'}{N}} + e[n, l],$$

where $$q' = q - \left\lceil \frac{Q}{2} \right\rceil, l \geq L$$

are assumed, and e[n, l] is the modelling error in the time domain due to the GCE-BEM modelling. At the receiver, after executing the SFFT and Wigner transforms, the received symbols in the delay-Doppler domain y[k, l] are given by $$y[k, l] = \sum_{n=0}^{N-1} r[n, l]e^{j2\pi\frac{-nk}{N}}$$

$$= \sum_{q=0}^{Q}\sum_{l'=0}^{L}\sum_{k'=0}^{N-1}\sum_{n=0}^{N-1} e^{\frac{j2\pi\phi(nM+l)}{M}} c_q[l']x[k', l-l']e^{j2\pi q'\frac{kM+l}{MN}}e^{j2\pi\frac{nk'}{N}}e^{j2\pi\frac{-nk}{N}} + z[k, l]$$

$$= e^{\frac{j2\pi\phi l}{M}} \sum_{q=0}^{Q}\sum_{l'=0}^{L}\sum_{k'=0}^{N-1}\sum_{n=0}^{N-1} c_q[l']x[k', l-l']e^{j2\pi q'\frac{kM+l}{MN}}e^{j2\pi\frac{nk'}{N}}e^{j2\pi\frac{-nk}{N}}e^{\frac{j2\pi\phi nN}{N}} + z[k, l],$$

$$= e^{\frac{j2\pi\phi l}{M}} \sum_{q=0}^{Q}\sum_{l'=0}^{L} c_q[l']x[k - q' - N\phi, l - l']e^{j2\pi\frac{q'l}{MN}} + z[k, l],$$

$$= \sum_{q=0}^{Q}\sum_{l'=0}^{L} c_q[l']x[k - q' - N\phi, l - l']e^{j2\pi\frac{(q'+N\phi)l}{MN}} + z[k, l]$$

where z[k, l] is the modelling error in the delay-Doppler domain due to the GCE-BEM modelling.

Compared to an ideal system without OFO this presents two issues:
i) more symbols in the Doppler-domain are interfering with each other and, thus, the inter-Doppler interference is stronger, and
ii) the phase of the received signal is changed by introducing an additional exponential term $$e^{\frac{j2\pi\phi l}{M}}.$$

Consequently, if the OFO is not properly addressed, the OTFS modulation will lose its superior performance in high-mobility communications. In addition, due to the presence of OFO, the OTFS channel estimation becomes more challenging.

Referring to FIG. 3, assume a scenario in which the carrier frequency $f_c$ set to 4 GHZ, the velocity to v=125 km/h, and the frequency error of the XO is ±1.5 ppm. The maximum Doppler frequency is calculated as $f_D$=500 Hz, and the OFO frequency is $f_{OFO}$=±6 KHz. FIG. 3 depicts an example of the possible Doppler spectrum, with $f_D$=500 Hz and $f_{OFO}$=−6 KHz, 0, 6 KHz. It is readily apparent that the OFO will shift the Doppler spectrum leftward or rightward, and thus, the maximum Doppler frequency is increased to $f_D+f_{OFO}$. In known OTFS channel estimators, e.g., those discussed in German patent publication No. DE 10 2022 106 409 A1 or in German patent publication No. DE 10 2021 126 321 A1, the subspaces or BEM basis functions need to be regenerated based on the new maximum Doppler frequency, i.e., $f_D+f_{OFO}$. Since the frequency shift due to the OFO is much larger than that due to the Doppler effect, the required number of subspaces or BEM basis functions will be increased significantly, leading to a high pilot overhead in OTFS frames having dedicated pilots, higher pilot power, and high computational complexity. Therefore, it is of great importance to estimate and compensate the OFO before implementing the OTFS channel estimators.

An aspect of the present invention enables OFO estimation and ultimately compensation by using a specific arrangement of first-type blocks and second-type blocks in the transmission frame, and by a specific arrangement of symbols in the first-type blocks, in particular by having at least some identical symbols in a first-type blocks preceding and following a second-type block.

FIG. 4A shows a first exemplary representation of the data symbols within the first-type blocks and the second-type blocks of the communication frame. The identical repetition of at least one data symbol in identical positions in the leading and trailing first-type, or low-rate, blocks is represented by the rectangular cross-hashing pattern, while the fully random nature of the data symbols in the second-type, or high-rate, block is represented by the pseudo-random pattern. The length of the communication frame in the delay domain is M, while the "height" of the communication frame in the Doppler domain is N. It is noted that the pilot symbols in the first-type blocks are likewise identical. The distance between two identical columns of subsequent first-type blocks is D. Within a communication frame at least two first-type blocks are provided, and one or more second-type blocks. Consequently, the length of the second-type blocks may vary. In FIG. 4A first-type blocks are arranged around the centre of the transmission frame, and second-type blocks are placed at the front, in the middle and at the back of the transmission frame.

FIG. 4B shows a second exemplary arrangement of the first-type blocks and the second-type blocks of the communication frame. Here, first-type blocks and second-type blocks are an alternatingly placed, i.e., a first-type block is followed by a second-type block, followed by a further first-type block, and finally by a further second-type block.

FIG. 4C shows a third exemplary arrangement of the first-type blocks and the second-type blocks of the communication frame. This arrangement corresponds to the one of FIG. 4B with the first-type blocks and the second-type blocks swapped.

FIG. 4D shows a fourth exemplary arrangement of the first-type blocks and the second-type blocks of the communication frame. Here, the first-type blocks are placed at the front and the back of the transmission frame, separated by a single second-type block.

The length L+1 of the first-type blocks depends from the longest path a signal travels in the channel. The channel length is represented in the channel matrix $H_t$, as will be described in the following.

As already mentioned further above the received OTFS vector y in the delay-Doppler domain is defined as $$y = [y[0, 0], y[0, 1], \ldots, y[0, M-1], \ldots, y[N-1, 0], y[N-1, 1], \ldots, y[N-1, M-1]]^T.$$

Considering a transmission frame with superimposed pilots, after propagating through the doubly-selective fading channel with Doppler spread, the received signal vector y can be considered the sum of the vectors representing the received data and the pilots superimposed thereon, respectively, in the delay-Doppler domain, and can be written as $$y = \sqrt{\alpha}(F_N \otimes I_M)E(\phi)H_t(F_N^H \otimes I_M)x_{sp} + \sqrt{1-\alpha}(F_N \otimes I_M)E(\phi)H_t(F_N^H \otimes I_M)x_d + w$$

where $F_N$ is the DFT matrix, $I_M$ the M×M identity matrix, w the additive white Gaussian noise (AWGN) vector, and $H_t$ the MN×MN time varying channel matrix in the time domain defined as.

$$H_t = \begin{bmatrix} h[0,0] & 0 & \ldots & 0 & h[0,L] & h[0,L-1] & \ldots & h[0,1] \\ h[1,1] & h[1,0] & 0 & \ldots & 0 & h[1,L] & \ldots & h[1,2] \\ \vdots & \ddots & \ddots & \ddots & \ddots & \ddots & \ddots & \vdots \\ h[L,L] & h[L,L-1] & \ldots & h[L,1] & h[L,0] & 0 & \ldots & 0 \\ \vdots & \ddots & \ddots & \ddots & \ddots & \ddots & \ddots & \vdots \\ 0 & \ldots & 0 & h[MN-1,L] & h[MN-1,L-1] & \ldots & h[MN-1,1] & h[MN-1,0] \end{bmatrix}$$

with h[t, l] denoting the channel gain of the l-th path at the t-th time instant, t=0, 1, ..., MN−1, and l=0, 1, ..., L, where L denotes the channel length. With $$f_{max} = \frac{f_c v}{c}$$

as the maximum Doppler frequency, where $f_c$ is the carrier frequency, v the vehicle speed, and c the speed of light, and considering Jakes' model with U-shaped Doppler spectrum, the correlation function of the l-th path is defined as $J_0(2\pi n f_{max} T_s)$, where $J_0(\cdot)$ denotes the zeroth-order Bessel function of the first kind, and $T_s$ the sampling period.

The distance D between the respective identical columns of the first-type blocks in the delay dimension of the high-rate block separating the low-rate blocks, in relation to the length M of the communication frame, determines the OFO range $$\left[-\frac{M}{2D}, \frac{M}{2D}\right]$$

that can be estimated. As the distance D is adjustable depending on the needs of the transmission system, and thanks to the utilization of SP, a broad and flexible OFO estimation range can be supported at low to moderate reduction of the spectral efficiency, which allows for using cheaper free-running XOs in the transmitters and receivers, translating into lower equipment cost.

The OFO can be estimated by exploiting the auto-correlation of two received first-type blocks of low-rate data and comprising SP in the front and back of OTFS frame.

Define $g_k = [y[k, L], y[k, M-1]]^T$. The autocorrelation matrix R is computed by $$R = \frac{1}{N}\sum_{k=0}^{N-1} g_k g_k^H.$$

Next, an Eigenvalue decomposition is implemented on R, and the signal eigenvector of length 2 is obtained as u. Define $u_1$ and $u_2$ as the first and the last element of u, respectively. Thanks to the constant phase shift property, $u_1$ and $u_2$ have the following relationship, $$u_2 = u_1 e^{j\frac{2\pi\phi D}{M}}.$$

As a result, the OFO can be easily estimated as:

$$\hat{\phi} = \frac{\angle\{u_1^\dagger u_2\} M}{2\pi D}$$

Thus, the OFO is estimated with a closed-form solution and does not require additional pilots. Note that the complexity of OFO estimation process is 4N.

By incorporating the OFO estimate $\hat{\phi}$ into the GCE-BEM basis function $b_q$, the new GCE-BEM basis function is obtained as $$\hat{b}_{OFO,q} = \text{diag}\left\{\left[1, e^{j\frac{2\pi\hat{\phi}}{M}}, \ldots, e^{j\frac{2\pi\hat{\phi}(MN-1)}{M}}\right]\right\} b_q$$

By taking into account ($Q$+1) BEM basis functions, the OFO compensation method has the linear complexity of MN($Q$+1). Thus, the general system model presented further above can be remodelled to $$y = \sum_{q=0}^{Q}(F_N \otimes I_M)\text{diag}\{\hat{b}_{OFO,q}\}F_{MN}^H \text{diag}\{F_{MN \times L}c_q\}F_{MN}(F_N^H \otimes I_M)x + z_{mod} + w$$

and the received signal vector y for the data and the superimposed pilots in the delay-Doppler domain can be written as $$y = \sqrt{\alpha}\sum_{q=0}^{Q}(F_N \otimes I_M)\text{diag}\{\hat{b}_{OFO,q}\}F_{MN}^H\text{diag}\{F_{MN \times L}c_q\}F_{MN}(F_N^H \otimes I_M)x_{sp} +$$

$$\sqrt{1-\alpha}\sum_{q=0}^{Q}(F_N \otimes I_M)\text{diag}\{\hat{b}_{OFO,q}\}F_{MN}^H\text{diag}\{F_{MN \times L}c_q\}F_{MN}(F_N^H \otimes I_M)x_d + w + z.$$

After the initial OFO estimation and compensation, due to the BEM modelling error and noise, a small residual OFO remains, which will be addressed in the joint estimation of the residual OFO and the communication channel.

Accordingly, in a first aspect of the present invention, a dual-rate communication frame for an OTFS transmission system is proposed. The communication frame comprises at least one first-type block and at least one second-type block. The one or more first-type blocks comprise data signals two-dimensionally arranged along the delay domain and the Doppler domain. At least one of the data signals of the one or more first-type blocks has a superimposed pilot signal. It is noted that typically the entire block has superimposed pilot signals. The one or more first-type blocks have a dimension of N×(L+1). The one or more second-type blocks comprise data signals two-dimensionally arranged along the delay domain and the Doppler domain, or data signals two-dimensionally arranged along the delay domain and the Doppler domain of which at least one has a superimposed pilot signal. In other words, a second-type block may or may not have superimposed pilots. At least one second-type block of the communication frame is preceded and followed, in the delay-domain, by first-type blocks. The first-type blocks preceding and following a second-type block having at least one identical data symbol and associated superimposed identical pilot symbol at an identical location in the two-dimensional arrangement. It is noted that typically the first-type blocks preceding and following a second-type block are identical. The identical elements of the first-type blocks preceding and following a second-type block permit or facilitate an initial OFO estimation, with high reliability. The use of identical symbols in the preceding and following first-type blocks reduce the useful data rate of the first-type blocks compared to the second-type block, hence the first-type block may be referred to as low-rate block, and the second-type block may be referred to as high-rate block.

FIG. 4E depicts a first example of superimposed pilots in the proposed dual-rate OTFS frame with SP, in which data symbols of both the first-type and the second-type blocks have superimposed pilot symbols. The placement of first-type blocks and second-type blocks corresponds to the one shown in FIG. 4D. The low-rate data symbols are shown in vertical and horizontal cross-hashed pattern, emphasizing their identical repetition in the leading and training first-type block. The high-rate data symbols are shown in the pseudo-random pattern, emphasizing the random nature of the data. The pilot symbols are shown in the regular checkerboard pattern, emphasizing the prior knowledge of the pilot symbols at the receiver. The pilot symbols extend over the entire communication frame, which, as per the placement of the first-type blocks and the second-type blocks of FIG. 4D that is used here, comprises two first-type, or low-rate, blocks that are placed at the front and back of the OTFS frame along the delay dimension, bracketing the second-type block. As mentioned before, the first-type blocks are used for an initial OFO estimation.

FIG. 4F depicts a second example of the proposed dual-rate OTFS frame with SP, in which only data symbols of the first-type blocks have superimposed pilot symbols. Like in FIG. 4D the low-rate data symbols are shown in vertical and horizontal cross-hashed pattern, emphasizing their identical repetition in the leading and training first-type block. The high-rate data symbols are shown in the pseudo-random pattern, emphasizing the random nature of the data. The pilot symbols are shown in the regular checkerboard pattern, emphasizing the prior knowledge of the pilot symbols at the receiver. Obviously, the pilot symbols extend only over the first-type, or low-rate, blocks. The data symbols of the second-type block do not have superimposed pilots, and consequently the entire power can be assigned to those data symbols.

It is noted that in the second example the pilot symbols may require higher power, as compared in the first example, and the convergence performances may be different. It is further noted that corresponding arrangements of superimposed pilots can be used in any of the other exemplary placements of the first-type blocks and the second-type blocks shown in FIGS. 4a) to 4c).

Consequently, in one or more embodiments at least the length of the second-type blocks arranged between a leading and a trailing first-type block is variable in the delay domain.

In one or more embodiments the data symbols in the first-type blocks preceding and following a second-type block of the communication frame exclusively carry data used for controlling the communication connection between transmitter and receiver. In addition to helping in the OFO estimation the use of identical symbols may provide a more robust channel control.

In accordance with a second aspect of the present invention, a transmitter of an OTFS transmission system comprises a signal mapper arranged upstream of a first transmitter-side transformation unit and a second transmitter-side transformation unit. The signal mapper is adapted to receive a binary data sequence and to output a two-dimensional arrangement of data symbols, and/or data symbols with superimposed pilot symbols, of a dual-rate communication frame in the delay-Doppler domain in accordance with the first aspect of the invention described hereinbefore. The first transmitter-side transformation unit is adapted to receive, at an input, the two-dimensional dual-rate communication frame in the delay-Doppler domain that is output from the signal mapper, and to output a two-dimensional arrangement of information symbols in the time-frequency domain. The two-dimensional arrangement of information symbols in the time-frequency domain comprises and represents both, data symbols and data symbols with SP. The output of the first transmitter-side transformation unit is provided to an input of the second transmitter-side transformation unit, which is adapted to output a continuous time-domain signal representing the communication frame, for transmission over the communication channel.

In one or more embodiments the first transmitter-side transformation unit is adapted to perform a pre-coding and/or an inverse symplectic finite Fourier transform.

In one or more embodiments the second transmitter-side transformation unit is adapted to perform a Heisenberg transform or an inverse finite Fourier transform (IFFT).

In one or more embodiments the transmitter is arranged to assign between 50% and 99%, preferably between 90% and 99%, of the total transmit power of a block having superimposed pilots to data symbols, and the remaining transmit power to pilot symbols.

In one or more embodiments the transmitter is arranged to adapt the power assigned to data and pilot symbols, respectively, in first-type or low-rate blocks in dependence of a communication channel used, a carrier frequency used and/or a differential speed between transmitter and receiver. The adaptation may be dynamic for individual or groups of subsequent communication frames, e.g., if the communication channel, the carrier frequency and/or the differential speed between transmitter and receiver vary.

In one or more embodiments the signal mapper is arranged to adapt the size, in particular the length in the delay-domain, of a first-type block and/or a second-type block in dependence of a communication channel used, a carrier frequency used, a maximum delay and/or a differential speed between transmitter and receiver. The adaptation may be dynamic for individual or groups of subsequent communication frames, e.g., if the communication channel, the carrier frequency and/or the differential speed between transmitter and receiver vary.

A static determination of the size of the first-type blocks and/or a second-type blocks, and/or of the power allocation ratio in the transmitter may be based on an assumption that the communication channel used, the carrier frequency and/or the differential speed between transmitter and receiver is static or varies negligibly within tolerable limits. The static determination may also consider a worst-case scenario, e.g., a maximum expected or permitted differential speed between transmitter and receiver, a maximum expected delay or the like, while the receiver and the transmitter are communicatively connected, e.g., within radio range. The expected maximum differential speed may be provided by external input data, e.g., speed limits for mobile entities like cars or trains within a coverage area of a fixed transmitter.

A dynamic adaptation of the size of the first-type blocks and/or a second-type blocks, and/or of the power allocation ratio in the transmitter may be based on an actual differential speed between transmitter and receiver. Such information may be provided from a receiver, e.g., a speed vector of the receiver, or on information available at the transmitter, e.g., a number of receivers that are within the range of the transmitter. In a stationary transmitter, e.g., a base station or the like, this number may correspond to the number of receivers currently or on average attached or in communicative connection with the transmitter. The dynamic adaptation may also be based on information received from a receiver such as channel status information, a bit error rate or a number of iterations of channel estimations required for decoding a previously received signal.

However, the power allocation and/or the size of the first-type and second-type blocks, and/or of the power allocation ratio in the transmitter, may also be tweaked for special requirements. For example, in order to achieve a fast convergence performance in the receiver, the power allocation ratio $\alpha$ could be selected smaller than the one with equal data SNR and pilot SNR, and/or the BEM resolution of the first channel estimation unit may be larger than 1. Simulations have shown that a power allocation ratio around 95% is advantageous for maximising of both BER and convergence performance.

Dynamically finding a near-optimal power allocation for pilot and data signals ratio may be achieved by performing training prior to the start of an actual transmission. As was mentioned further above, an advantageous power allocation ratio may be found when the average data SNR and average pilot SNR are equal.

In accordance with a third aspect of the present invention, a receiver for an OTFS transmission system comprises a first receiver-side transformation unit and a second receiver-side transformation unit. The receiver is adapted to receive a time-domain signal representing a communication frame in accordance with the first aspect of the invention transmitted over a practical communication channel, i.e., a communication channel subject to Doppler spread, at an input of the first receiver-side transformation unit, which first receiver-side transformation unit outputs a two-dimensional representation of the received communication frame in the time-frequency domain. The output of the first receiver-side transformation unit is provided to an input of the second receiver-side transformation unit, which outputs a two-dimensional representation of the received communication frame comprising first-type blocks and second-type blocks in the delay-Doppler domain. The receiver comprises an OFO estimator that is configured for performing an initial OFO estimation and compensation using symbols carried in the first-type block of the received communication frame, and further comprises an iterative two-stage channel estimation and equalization block that is configured for performing a joint estimation of a residual OFO and the communication channel based on symbols carried in all blocks of the received communication frame.

Accordingly, in accordance with one or more embodiments the initial OFO estimation includes performing the auto-correlation of the received OTFS symbols carried in the first-type blocks of the received communication frame, corresponding to low-rate data and SP. The initial OFO compensation comprises providing the initial OFO estimate to the iterative two-stage channel estimation and equalization block, for incorporating with the BEM basis functions used for the channel estimation. Incorporating the OFO estimate with the BEM basis function yields a new BEM basis function $b_{OFO,q}$ as discussed further above.

In accordance with one or more embodiments the joint estimation of the remaining OFO and the channel uses an iterative two-stage channel estimation implementing an initial channel estimation followed by an initial equalization and symbol estimation, and an iterative channel estimation followed by respective equalization and symbol estimation.

In accordance with one or more embodiments at least the pilot signals output from the second receiver-side transformation unit are provided to a first channel estimation unit, which outputs a first estimation of the time-domain channel matrix $\hat{H}_t^{i=0}$. The first estimation of the time-domain channel matrix $\hat{H}_t^{i=0}$, as well as at least the data signals output from the second receiver-side transformation unit or the pilot and data signals output from the second receiver-side transformation unit, are provided to an equalizer unit, which outputs an estimated set of at least data signals. The estimated set of at least data signals, as well as at least the first-type blocks or the first-type blocks and the second-type blocks output from the second receiver-side transformation unit, are provided to a second channel estimation unit, which outputs a second estimation of the time-domain channel matrix $\hat{H}_t^{i\geq 1}$. The output $\hat{H}_t^{i\geq 1}$ of the second channel estimation unit, as well as at least the data signals output from the second receiver-side transformation unit or the pilot and data signals output from the second receiver-side transformation unit, are provided to the equalizer unit, which outputs a further estimated set of at least data signals. The channel estimation in the second channel estimation unit and estimating an estimated set of at least data signals in the equalizer unit is iteratively repeated until a termination criterion is met. In other words, the process of estimating the time-domain channel matrix $\hat{H}_t^i$ in the second channel estimation unit and estimating sets of at least data symbols in the equalizer unit, feeding back the respective latest output from the equalizer unit, as well as at least the pilot signals output from second receiver-side transformation unit or the pilot and data signals output from the second receiver-side transformation unit, to the second receiver-side channel estimation unit, are repeated until the termination criterion is met.

Termination criteria may include convergence of the outputs of the equalizer unit. Such convergence may be assumed, e.g., when the bit error rate of the decoded output of the equalizer unit for two subsequent iterations is below a predetermined threshold. The threshold may be, e.g., a difference in bit error rates that is smaller than $10^{-6}$. Another conceivable termination criterion may be a predetermined number of iterations. It is also possible to set a maximum number of iterations after which the iteration is terminated, but to terminate the iteration earlier when the bit error rate for two subsequent iterations lies below the predetermined threshold before the maximum number of iterations is reached.

In one or more embodiments of the receiver the first receiver-side transformation unit is adapted to perform a finite Fourier transform, an inverse Heisenberg-, or Wigner-transform.

In one or more embodiments of the receiver the second receiver-side transformation unit is adapted to perform a symplectic finite Fourier transform.

In one or more embodiments of the receiver the first channel estimation unit is adapted to perform a channel estimation based on a basis expansion modelling of a first BEM order of the time-varying communication channel. The first BEM order refers to the order of basis expansion for modelling the communication channel. The first channel estimation preferably is a pilot-aided channel estimation, i.e., uses the known locations and/or other properties of the pilot signals in the communication frame for estimating.

In one or more embodiments of the receiver the equalizer performs a message passing, a zero-forcing and/or a minimum mean square error equalization.

In one or more embodiments of the receiver the second channel estimation unit is adapted to perform a channel estimation based on a basis expansion modelling of a second BEM order of the time-varying communication channel. The second BEM order refers to the order of basis expansion for modelling the communication channel. The second channel estimation preferably is a data-aided channel estimation, i.e., uses the signals estimated in the equalizer unit in addition to the pilot signals in the communication frame for estimating.

The first and the second BEM orders of the first and second channel estimation units may be the same or different. It is noted that a small BEM order $Q$ and a lower BEM resolution T may be used when a low pilot power is required. However, a small BEM order typically results in a slower convergence. A higher BEM order with a higher resolution result in a superior performance and faster convergence, but may require higher pilot power. For example, when the BEM order is increased from $Q=2$ to $Q=4$, the resolution T may advantageously be increased from 1 to 2.

Thanks to the estimation of the OFO in the receiver the residual OFO is comparatively small. This allows for using a small BEM order $Q$ and a small resolution T in the initial channel estimation, while still achieving near optimal performance and fast convergence.

One or more embodiments of the receiver further comprise a control unit that is adapted to receive information about the absolute speed and direction of the receiver over ground, the absolute speed and direction of the transmitter over ground and/or the relative speed between the receiver and the transmitter, and is further adapted to determine a BEM order $Q$s, and/or is adapted to receive the BEM order $Q$s used at the transmitter for composing the communication frame. The received or determined BEM order $Q$s and/or the received information is passed to the first and/or second channel estimation unit, for determining the respective order of BEM to be applied or used. Information about the BEM order $Q$s used at the transmitter may be transmitted, e.g., when a mobile terminal attaches to a base station, or more generally, when a communication connection between a transmitter and a receiver is established. While a few bytes are needed for such transmission this may increase the performance and/or the spectral efficiency.

If no dynamic adaptation of the BEM order $Q$s is used, the receiver may assume a stipulated default value.

The various elements of the transmitter and the receiver presented above may be implemented in hardware, as software modules, or combinations thereof, i.e., hardware that is controlled and/or parameterized through software. In particular, the first and second channel estimation units of the receiver may rely on the same hardware or software module, and may be parameterized for the respective pilot-aided or data-aided channel estimation, using respective input data and GCE-BEM parameters.

A wireless device in accordance with a fourth aspect of the present invention comprises a transmitter and/or a receiver for an OTFS transmission system as described hereinbefore.

In accordance with a fifth aspect of the present invention, a method of transmitting a binary data sequence over an OTFS communication channel comprises mapping, in a signal mapper, a previously received binary data sequence into a two-dimensional arrangement of data symbols, and data symbols with superimposed pilot symbols, of a dual-rate communication frame in the delay-Doppler domain in accordance with the first aspect of the invention described hereinbefore. The two-dimensional arrangement forms a communication frame for an OTFS transmission system. Mapping may include receiving the binary data sequence at an input of the signal mapper and providing the two-dimensional arrangement of data symbols, and data symbols with SP, at an output of the signal mapper.

The method further comprises transforming, in a first transmitter-side transformation unit, the two-dimensional communication frame in the delay-Doppler domain into a two-dimensional arrangement of information symbols in the time-frequency domain. The first transformation may include receiving the two-dimensional communication frame in the delay-Doppler domain at an input of the first transmitter-side transformation unit and providing the two-dimensional arrangement of information symbols at an output of the first transmitter-side transformation unit.

The method yet further comprises transforming, in a second transmitter-side transformation unit, the two-dimensional arrangement of information symbols into a continuous time-domain signal representing the communication frame. The second transformation may include receiving the two-dimensional arrangement of information symbols in the time-frequency domain at an input of the second transmitter-side transformation unit and providing the continuous time-domain signal representing the communication frame at an output of the second transmitter-side transformation unit.

The method further comprises transmitting the continuous time-domain signal representing the communication frame over the communication channel. Transmitting may include steps known from conventional transmitters such as amplifying, beam-forming and directing and the like.

In one or more embodiments of the method, the first transforming step comprises subjecting the two-dimensional communication frame in the delay-Doppler domain to an inverse symplectic finite Fourier transform.

In one or more embodiments of the method, the second transforming step comprises subjecting the two-dimensional arrangement of information symbols to a Heisenberg transform or an IFFT.

In one or more embodiments the method further comprises setting a power allocation ratio between data and pilot symbols between 0.5 and 0.99, preferably between 0.9 and 0.99.

In one or more embodiments the method further comprises adapting a power allocation ratio between data and pilot symbols in dependence of a communication channel used, a carrier frequency used and/or a differential speed between transmitter and receiver.

In one or more embodiments the method further comprises adapting the number of data symbols having superimposed pilots in dependence of a communication channel used, a carrier frequency used and/or a differential speed between transmitter and receiver.

In accordance with a sixth aspect of the present invention, a method of receiving a binary data sequence over a practical OTFS communication channel comprises receiving a continuous time-domain signal representing a communication frame in accordance with the first aspect of the invention over the communication channel. The method further comprises transforming, in a first receiver-side transformation unit, the continuous time-domain signal representing the communication frame into a two-dimensional arrangement of information symbols in the time-frequency domain that is available at an output of the first receiver-side transformation unit. In a next step of the method the two-dimensional arrangement of information symbols comprising pilot and data signals in the time-frequency domain is transformed, in a second receiver-side transformation unit, into a two-dimensional communication frame comprising pilot and data signals in the delay-Doppler domain, which is made available at an output of the second receiver-side transformation unit. Next, an OFO is estimated from the first-type blocks of the communication frame, which OFO is provided to a channel estimation unit, for incorporating the OFO estimate into the CE function applied.

For obtaining a first estimation of the time-domain channel matrix $\hat{H}_t^{i=0}$ at an output of a first channel estimation unit the first-type blocks or the first-type blocks and the second-type blocks of the two-dimensional communication frame in the delay-Doppler domain is/are provided to a first channel estimation unit. The first estimation of the time-domain channel matrix $\hat{H}_t^{i=0}$ as well as the communication frame output from the second receiver-side transformation unit, with the superimposed pilot symbols removed, are then provided to an equalizer unit, for obtaining an estimated set of at least data signals at an output of the equalizer unit.

Next, the first-type blocks and the second-type block output from the second receiver-side transformation unit as well as the estimated set of at least data signals that are output from the equalizer unit are provided to a second channel estimation unit, for estimating a further estimation of the time-domain channel matrix $\hat{H}_t^{i\geq 1}$. The further estimation of the time-domain channel matrix $\hat{H}_t^{i\geq 1}$ available at an output of the second channel estimation unit, as well as the communication frame output from the second receiver-side transformation unit, with the superimposed pilot symbols removed, are then provided to the equalizer unit, for obtaining a further estimated set of at least data signals. Estimating the time-domain channel matrix $\hat{H}_t^{i\geq 1}$ in the second channel estimation unit and estimating sets of at least data signals in the equalizer unit is iteratively repeated until a termination criterion is met. In the iterative repetition, the respective latest further estimated set of at least data signals and the superimposed pilot signals are used for estimating the time-domain channel matrix $\hat{H}_t^{i\geq 1}$, and the respective latest estimated time-domain channel matrix $\hat{H}_t^{i\geq 1}$ as well as the communication frame output from the second receiver-side transformation unit are used for the next estimation of at least data signals.

In one or more embodiments of the method, transforming the continuous time-domain signal representing the communication frame into a two-dimensional arrangement of information symbols in the time-frequency domain comprises subjecting the continuous time-domain signal representing a communication frame to a finite Fourier transform, an inverse Heisenberg-, or Wigner-transform.

In one or more embodiments of the method, transforming the two-dimensional arrangement of information symbols comprising data signals, and data signals with SP, in the time-frequency domain into a two-dimensional communication frame comprising data signals, and data signals with SP, in the delay-Doppler domain comprises subjecting the two-dimensional arrangement of information symbols comprising data signals, and data signals with SP, in the time-frequency domain to a symplectic finite Fourier transform.

In one or more embodiments of the method, estimating the OFO from the first-type blocks comprises separating the first-type blocks from the received communication frame, performing an auto-correlation at least on the SP symbols contained therein, and extracting the OFO information from the autocorrelation.

In one or more embodiments of the method, obtaining the first estimation of the time-domain channel matrix $\hat{H}_f^{i=0}$ comprises performing a channel estimation based on a basis expansion modelling of the time-varying communication channel of a first BEM order.

In one or more embodiments of the method, estimations of the time-domain channel matrix $\hat{H}_f^{i \geq 1}$ in the second channel estimation unit comprises performing a channel estimation based on a basis expansion modelling of the time-varying communication channel of a second BEM order.

As mentioned further above, the first and the second BEM orders $Q$, and/or the resolutions T of the first and second channel estimation units, respectively, may be the same or different.

In one or more embodiments of the method, obtaining an estimated set of at least data signals in the equalizer unit comprises subjecting at least the data signals obtained after the second transformation in the second receiver-side transformation unit to a message passing, a zero-forcing and/or a minimum mean square error equalization. This may include previously removing any superimposed pilot signal from the transmission frame.

In one or more embodiments the method further comprises receiving, in a control unit, information about the absolute speed and direction of the receiver over ground, the absolute speed and direction of the transmitter over ground and/or the relative speed between the receiver and the transmitter, and determining a BEM order $Q$s, and/or receiving the BEM order $Q$s used at the transmitter for composing the communication frame. The received information may be used for determining the respective BEM order to be used in the first and/or in the second channel estimation unit. The respective received or determined BEM order is provided to the first and/or to the second channel estimation unit.

The methods of transmitting and/or receiving may be represented by computer program instructions which, when executed by a microprocessor, cause the computer and/or control hardware components of a transmitter or a receiver of an OFTS transmission system as presented hereinbefore, respectively, to execute the method of transmitting or receiving as presented hereinbefore, respectively.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

The OTFS receiver presented hereinbefore provides resilience against time-frequency distortion, e.g., caused by the OFO of free-running crystal oscillators, by using dual-rate data and SP.

Subjecting two identical first-type blocks carrying data symbols and superimposed pilots, carefully designed to support a broad OFO estimation range, to an autocorrelation provides an initial OFO estimate that leaves only a small residual OFO. The OFO estimate is incorporated with the BEM basis functions, and the residual OFO due to the BEM modelling error and noise is estimated jointly with the OTFS channel using the superimposed pilots and the pseudo pilots in an iterative process. Using superimposed pilots contributes to a high spectral efficiency, and the OFO estimation allows for reducing the signal power assigned to the SP, leaving more signal power for data signals, which gives rise to higher reliability of the signal estimation.

It is noted that the OFO has an impact on the BER and the MSE of the symbol detection. As the remaining OFO increases, the BER worsens slightly. This can be compensated by increasing the SNR of the data symbols in the first-type blocks.

XOs with a very small OFO are typically more expensive and require more power to operate. The proposed communication frame, in a transmitter and receiver executing the respective methods according to an aspect of the invention, permits handling the larger OFO of less expensive XOs having larger OFO at lower power requirements and, thus, also permits reducing the power consumption while at the same time reducing the equipment cost. Thanks to the flexible design of the first-type blocks and the second-type blocks, the OFO can be estimated with a broad range that can be adjusted to the system's needs.

Using first-type blocks and second-type blocks, and using SP, permits estimating OFO and performing OTFS channel estimation at low cost in terms of reduced data rate for the frame. By carefully designing the positions of the first-type blocks, the OFO estimation does not require additional dedicated pilot signals.

The proposed OTFS receiver achieves excellent performance in terms of bit error rate (BER), mean-square-error (MSE) of OFO estimation, and MSE of channel estimation while not requiring dedicated pilot signals, thanks to the careful design of the communication frame with first- and second-type blocks, the first-type blocks offering low-rate data rate and SP. Its BER performance is close to the BER lower bound which assumes the perfect estimation and compensation of OFO and channel.

The inventive communication frame, transmitter, receiver, and the respective methods according to aspects of the invention can advantageously be used for high mobility communication.

BRIEF DESCRIPTION OF THE DRAWING

In the following section exemplary embodiments of the invention will be described in greater detail with reference to the drawing. In the drawing.

Throughout the figures identical or similar elements may be referenced using the same reference designators.

DETAILED DESCRIPTION OF EMBODIMENTS

FIGS. 1 to 4F have been described further above and will not be discussed again.

Figure 5:
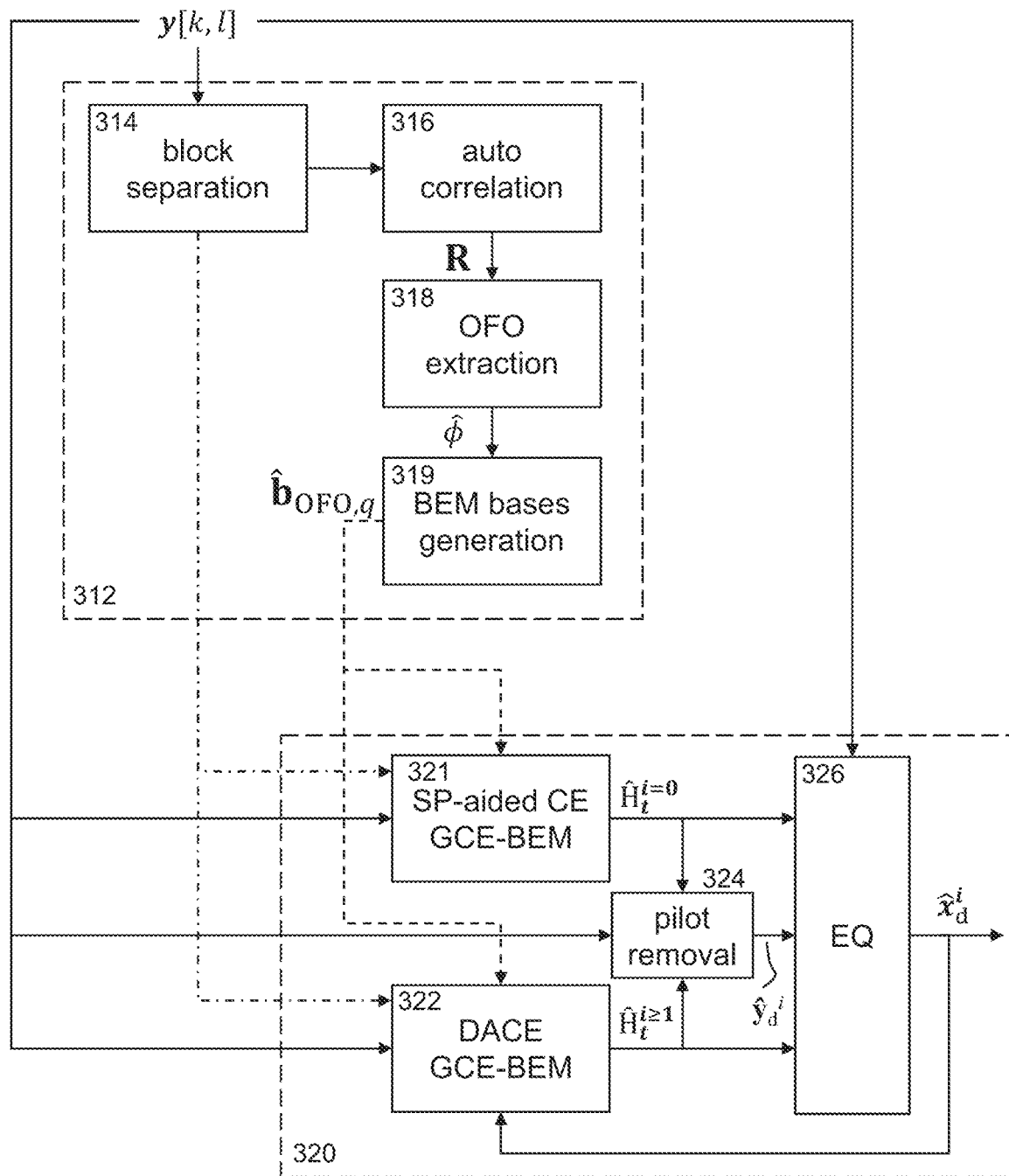
FIG. 5 shows a block diagram of the OFO estimation, channel estimation and equalization of an exemplary receiver in accordance with an aspect of the present invention.

FIG. 5 shows a schematic block diagram of the initial OFO estimation and compensation and the joint residual OFO and channel estimation in an exemplary receiver 300 in accordance with an aspect of the present invention. After executing the SFFT and Wigner transforms, the received symbols in the delay-Doppler domain y[k, l] are available for further processing.

Figure 1:
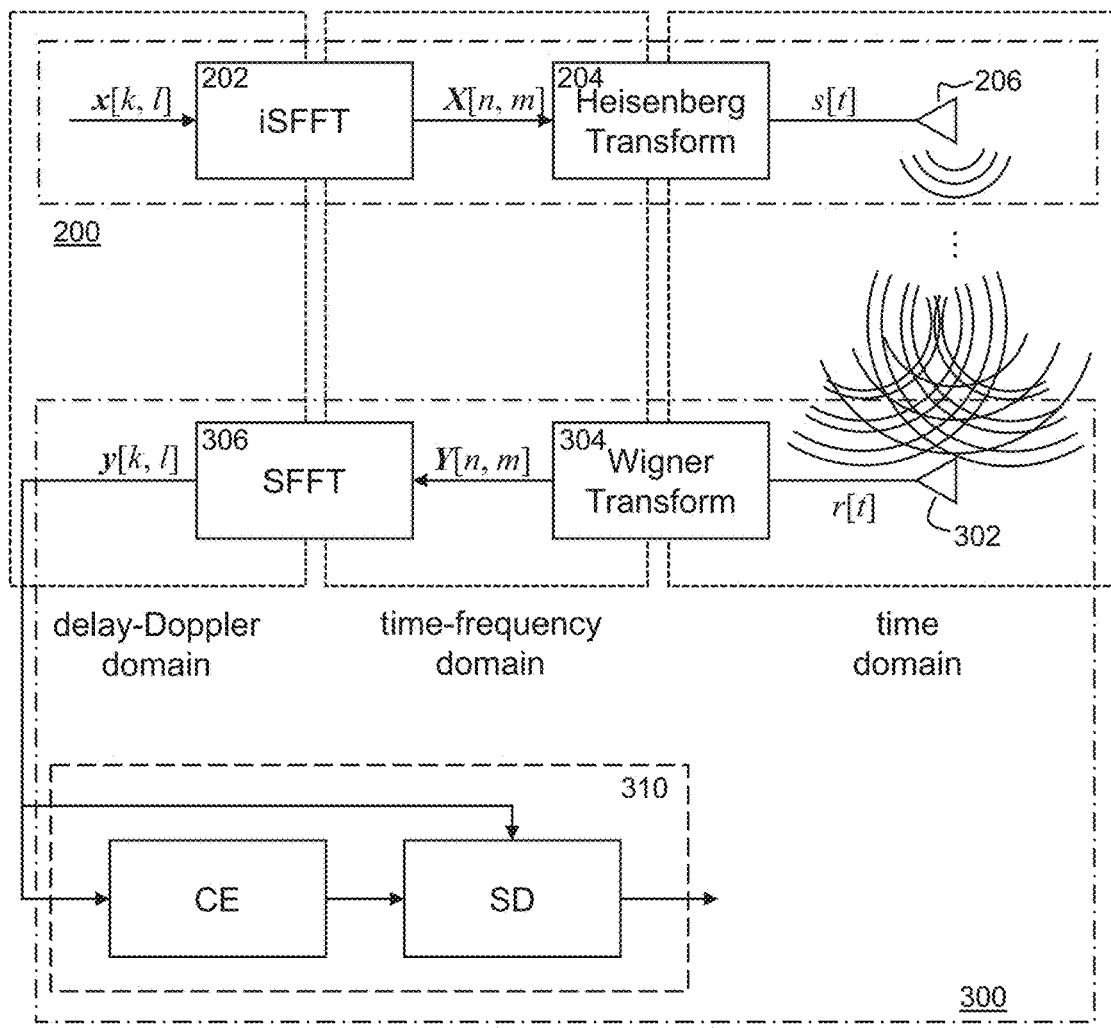
FIG. 1 shows a block diagram of a general OTFS transmission system, FIG. 2 schematically shows the superimposed pilots and their power allocation.
Figure 2:
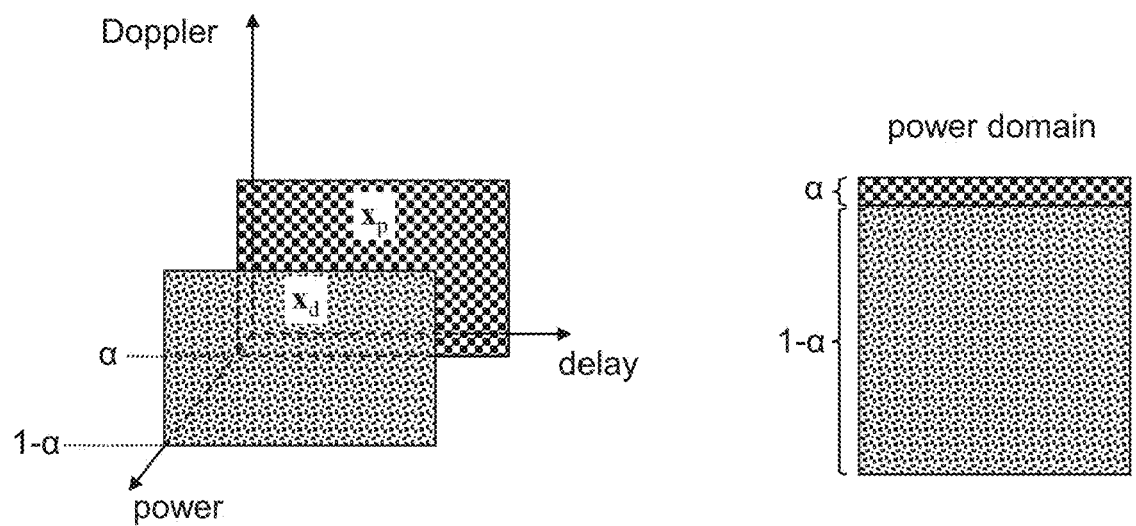
Figure 3:
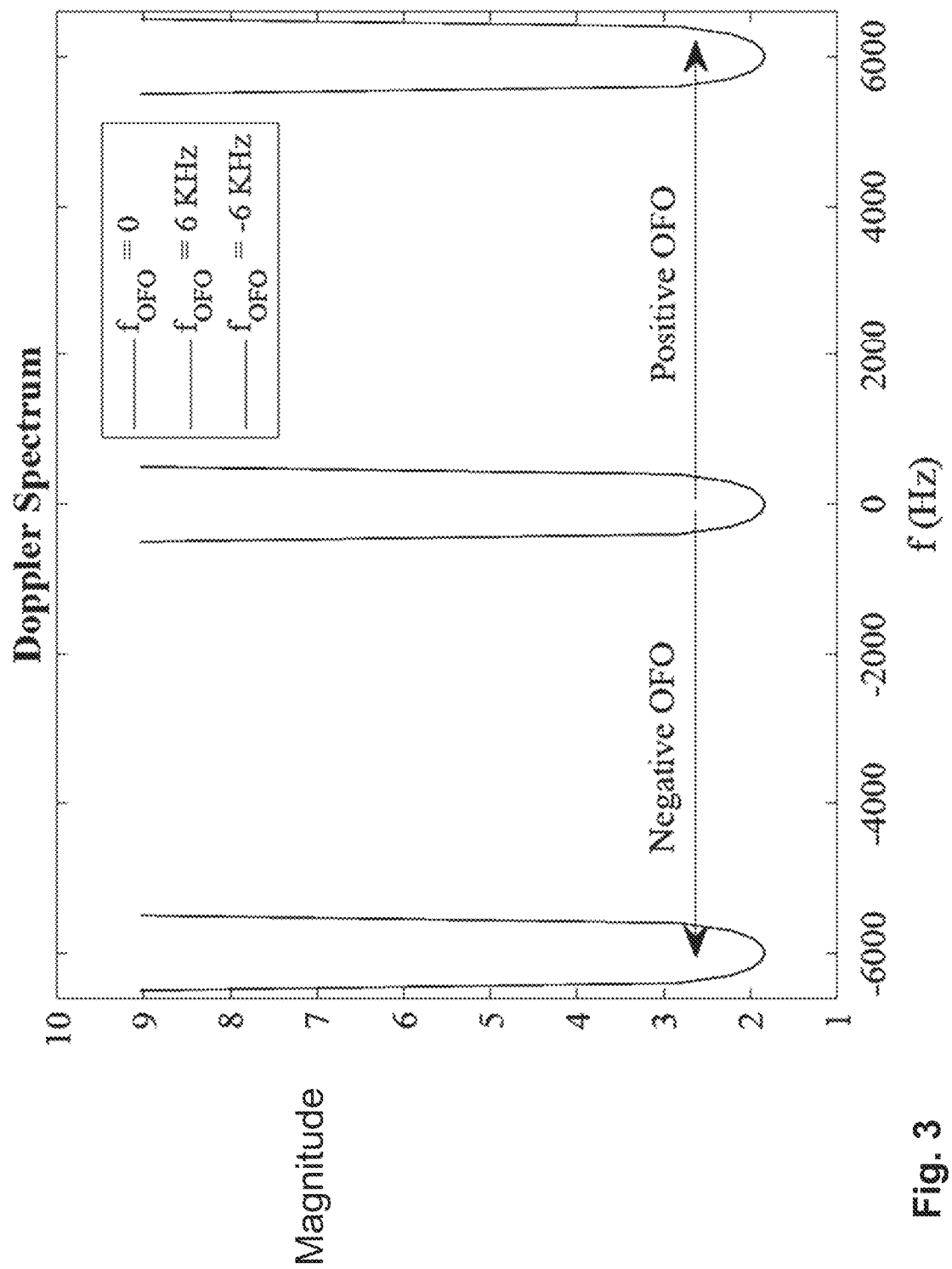
FIG. 3 shows an exemplary visualisation of the Doppler spectrum shifts in an OTFS communication channel in the presence of OFO.
Figure 4A:
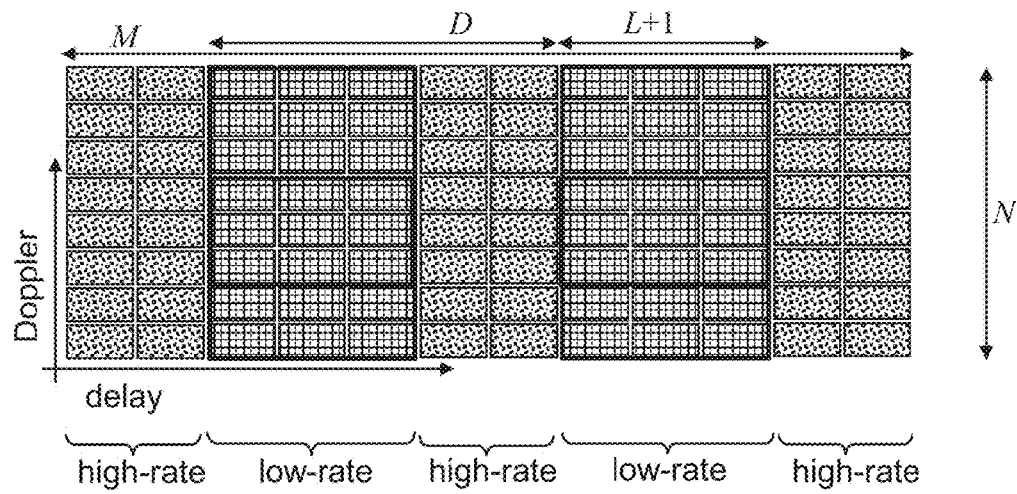
FIGS. 4A-4F depict exemplary OTFS frame pattern according to an aspect of the present invention at the transmitter.
Figure 4B:
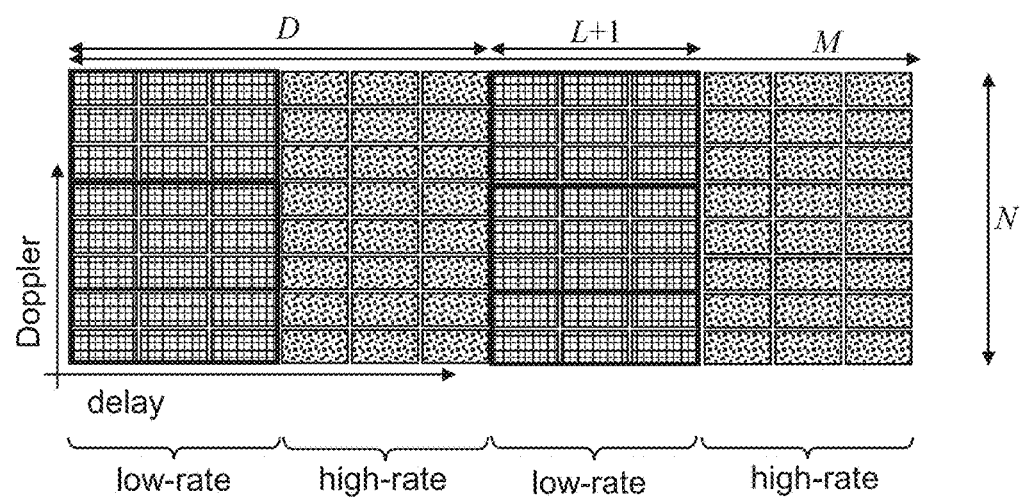
Figure 4C:
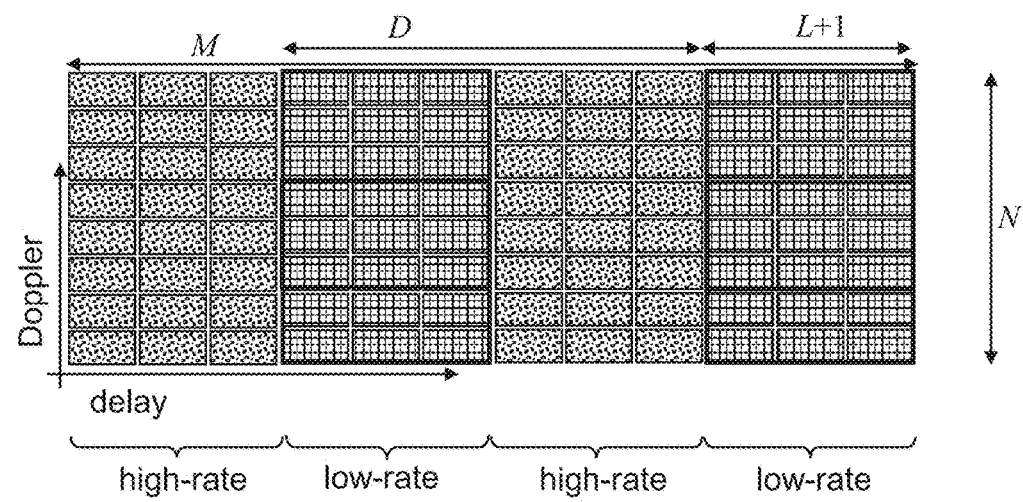
Figure 4D:
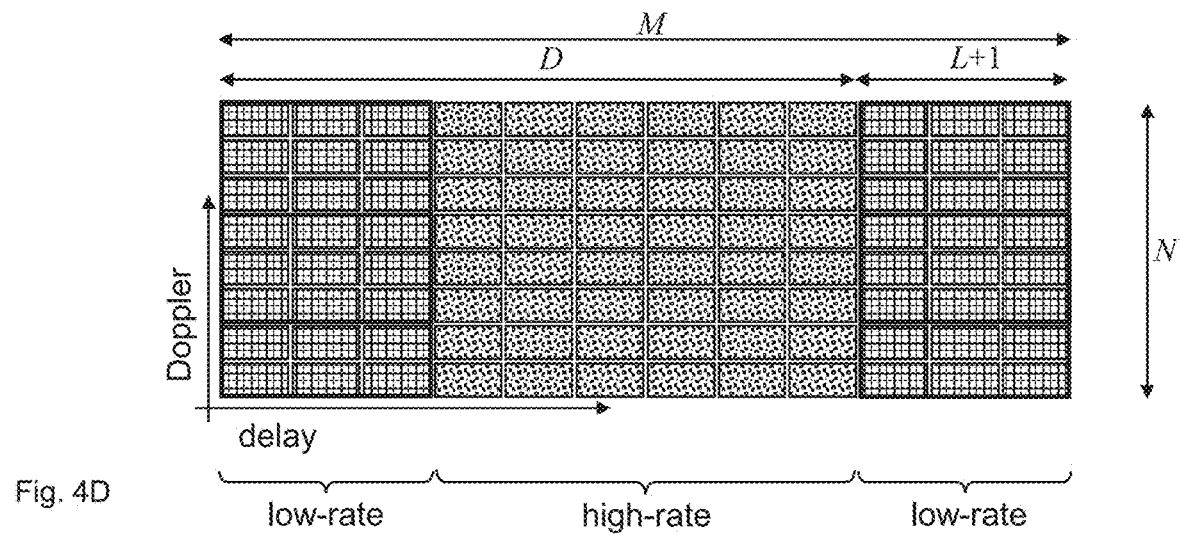
Figure 4E:
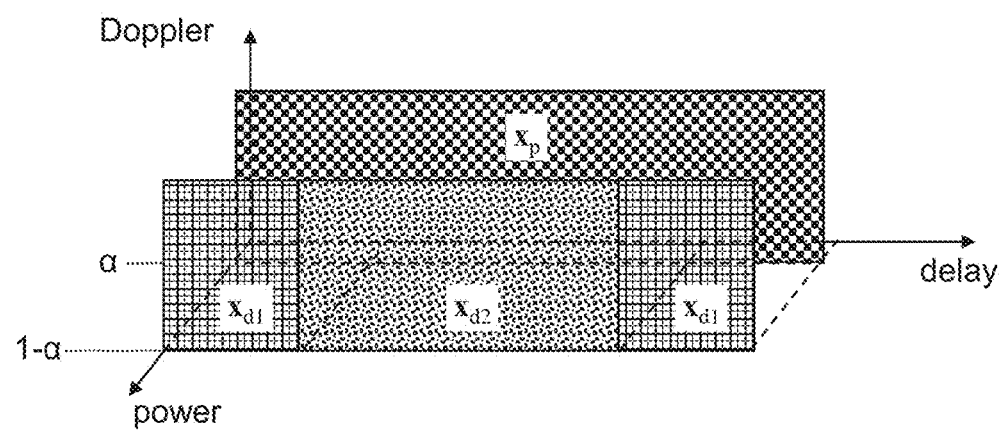
Figure 4F:
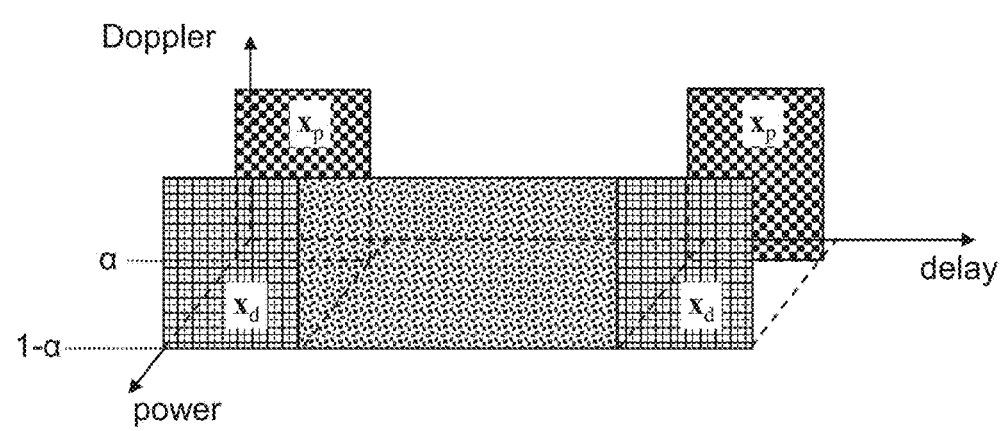

The OFO estimation 312, channel estimation 320 with the iterative two-stage CE blocks 321, 322, and equalization 326 replace the generic channel estimation and equalization block 310 shown in FIG. 1. All other elements of the receiver 300 shown in FIG. 1, i.e., first and second receiver-side transformation units 304 and 306, respectively, are identical and are not shown in the figure.

The first-type blocks carrying data symbols and superimposed pilots and the second-type blocks carrying either data symbols only or data symbols and superimposed pilots in two-dimensional arrangements that are output from the second receiver-side transformation unit 306 as signal y[k, l] in the delay-Doppler domain may first be provided to the OFO estimator unit 312. OFO estimator unit 312 comprises a block separation unit 314, which separates the first-type blocks from the second-type blocks of the communication frame, and provides the first-type blocks to an autocorrelation unit 316. The autocorrelation may include or be followed by an Eigenvalue decomposition (not shown in the figure). The result of the autocorrelation is provided to the OFO extraction unit 318, which determines the OFO and provides it to a BEM bases generation unit 319. Based on the OFO estimate $\hat{\phi}$ output from the OFO extraction unit 318 BEM bases generation unit 319 determines the BEM bases to be used in the channel estimation units 321 and 322, and forwards corresponding information accordingly to the first and second channel estimation units 321, 322.

The first-type blocks carrying data symbols and superimposed pilots output from the low-rate block extraction unit 314, or the entire frame represented by signal y[k, l] comprising first-type blocks and second-type blocks in the delay-Doppler domain are provided to a first channel estimation unit 321, which performs a superimposed pilot-aided, OFO-included first channel estimation using a GCE-BEM channel model with a first BEM order $Q$s. The first BEM order $Q$s may be small, using a low-resolution T, albeit at the cost of a slower convergence. However, the first BEM order $Q$s may also be rather large, using a higher resolution T, resulting in a faster convergence. First channel estimation unit 321 outputs a first or initial channel estimation $\hat{H}_t^{i=0}$, which is provided to an input of a pilot removal unit 324.

The communication frame represented by signal y[k, l] comprising first-type blocks and second-type blocks in the delay-Doppler domain are also provided to an input of a pilot removal unit 324 and to an input of a second channel estimation unit 322.

Pilot removal unit 324 uses the respective most recent channel estimation output by either the first channel estimation unit 321 or the second channel estimation unit 322 to remove the superimposed pilot signals present in the signal y[k, l], using the knowledge of the construction of the transmitted communication frame, i.e., the arrangement and power level thereof, leaving only the data signals. The output signal $\hat{y}_d^i$ of pilot removal unit 324 is provided to equalizer unit 326. Equalizer unit 326 determines and outputs estimations $\hat{x}_d^i$ of the transmitted data symbols.

Once the initial channel estimation in the first channel estimation unit 321 and the initial estimation $\hat{x}_d^{i=0}$ of the transmitted data symbols have been executed, the respective most recent set of estimated data symbols $\hat{x}_d^i$ is provided to an input of the second channel estimation unit 322 in an iterative fashion. The second channel estimation unit 322 performs data-aided, OFO-included channel estimations on the superimposed pilots comprised in the signal y[k, l] and the estimations $\hat{x}_d^i$ of the transmitted symbols fed back to the second channel estimation unit 322 from equaliser unit 326 as pseudo pilots in addition to the superimposed pilots, using a GCE-BEM channel model with a second BEM order $Q_L$ and a second resolution T. The second channel estimation unit 322 may use a higher BEM order $Q_L$ and a higher resolution T than the first channel estimation unit, although same BEM orders $Q_L$ and resolutions T are also conceivable.

In each iteration the respective most recent output of the second channel estimation unit 322, which represents a channel estimation $\hat{H}_t^{i \geq 1}$, is input to the pilot-removal unit 324. Based thereon, pilot removal unit 324 removes the superimposed pilots from the received signal vector y[k, l] in the delay-Doppler domain, and provides an estimation of a signal representing only the received data signal $\hat{y}_d^i$, to an input of equaliser unit 326. Equaliser unit 326 outputs estimations $\hat{x}_d^i$ of the transmitted data symbols that are improved over the previous ones. Iterations may be repeated until a termination criterion is fulfilled.

Figure 6:
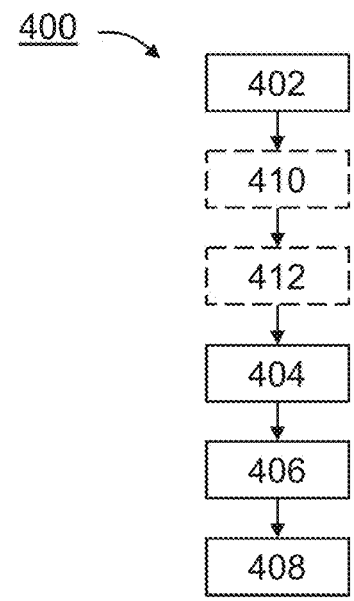
FIG. 6 shows a flow diagram of a method of transmitting a binary data sequence over an OTFS communication channel.

FIG. 6 shows a flow diagram of a method 400 of transmitting a binary data sequence over an OTFS communication channel. In step 402 a binary data sequence is mapped into a two-dimensional communication frame in the delay-Doppler domain, comprising a first-type block and a second-type block, in accordance with the first aspect of the invention. In step 404 the two-dimensional communication frame in the delay-Doppler domain is transformed into a two-dimensional arrangement of information symbols in the time-frequency domain. In step 406 the two-dimensional arrangement of information symbols in the time-frequency domain is transformed into a continuous time-domain signal representing the communication frame, which is transmitted over the channel in step 408. Prior to transforming the two-dimensional arrangement of information symbols in the delay-Doppler domain into a two-dimensional arrangement of information symbols in the time-frequency domain a power allocation ratio between pilot and data signals and/or a number of data symbols having superimposed pilots may be determined or adapted in optional step 410, which is set in optional step 412.

Figure 7:
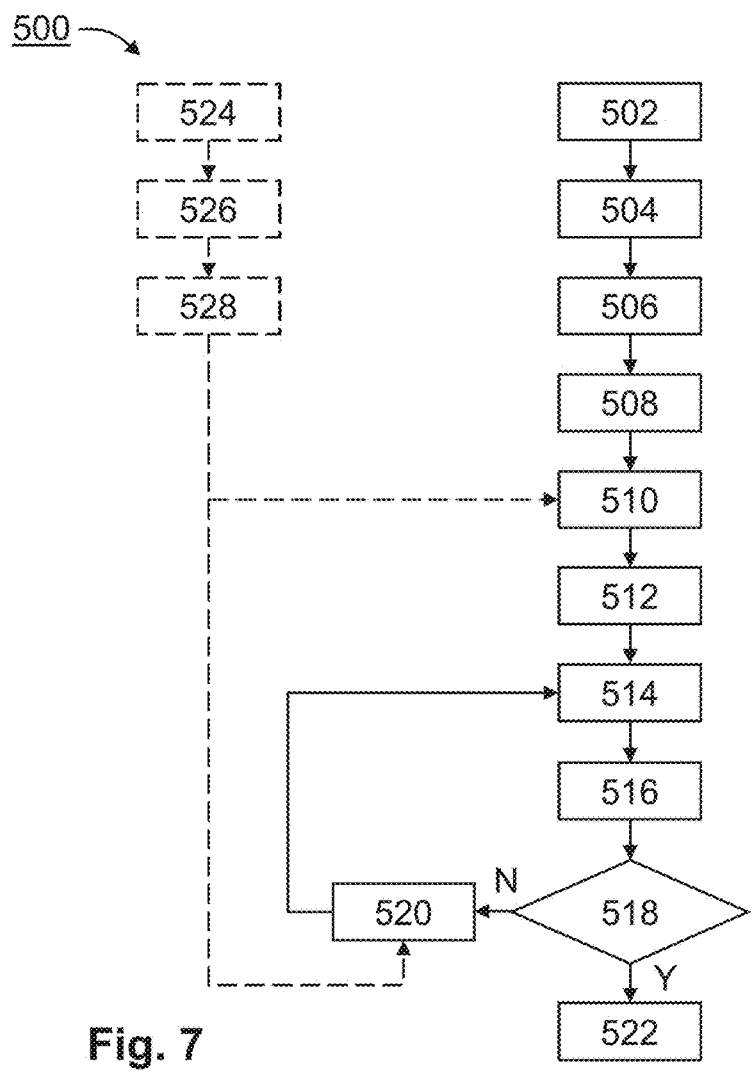
FIG. 7 shows a flow diagram of a method of receiving a binary data sequence over an OTFS communication channel susceptive to doubly-selective fading.

FIG. 7 shows a flow diagram of a method 500 of receiving a binary data sequence, carried in a communication frame in accordance with the first aspect of the present invention, over an OTFS communication channel susceptive to doubly-selective fading. In step 502 a continuous time-domain signal representing the communication frame is received over the communication channel. In step 504 the continuous time-domain signal representing the communication frame is transformed into a two-dimensional arrangement of information symbols in the time-frequency domain. In step 506 the two-dimensional arrangement of information symbols comprising pilot and data signals in the time-frequency domain is transformed into a two-dimensional communication frame in the delay-Doppler domain, comprising a first-type block and a second-type block, in accordance with the first aspect of the invention. In step 508 an OFO is estimated from the first-type blocks of the communication frame and provided, in step 510, from an OFO estimator 312 to a channel estimation unit 321, 322, for incorporating the OFO estimate $\hat{\phi}$ into the CE function applied. In step 512 an initial estimation of a time-domain channel matrix is obtained in a first channel estimation unit 321 that performs a channel estimation, on the first-type block or on the first-type and the second-type block, based on a basis expansion modelling of the time-varying communication channel of a first BEM order and at a first resolution. In step 514 the pilot symbols are removed from the received communication frame represented by the first-type and the second type blocks, and the resulting signal is provided to an equalizer unit 326. In step 516 an estimated set of at least data signals is determined in equalizer unit 326, based on the channel estimation and the communication frame in the delay-Doppler domain. Step 518 checks if a termination criterion is met, which in the positive case, "Yes"-branch of step 518, signals that the estimated received symbols can be output to a de-mapper, in step 522, and ultimately can be output as a received binary sequence. If the termination criterion is not met, "No"-branch of step 518, a further estimation of a time-domain channel matrix is obtained, in step 520, in a second channel estimation unit 322 that performs a channel estimation based on a basis expansion modelling of the time-varying communication channel of a second BEM order and at a second resolution, using the previously estimated data signals in addition to the pilot signals. The result of the further channel estimation is provided to the pilot symbol removing step 514, and the equalizing step 516 and the checking step 518 for the termination criterion are repeated.

Optionally, in step 524, a BEM order $Q$s that was used in the transmitter may be received, or information permitting determining a BEM order to be used in the channel estimation. In step 526 the BEM order $Q$s to be used is determined, and provided to the channel estimation unit in step 528.

Figure 8:
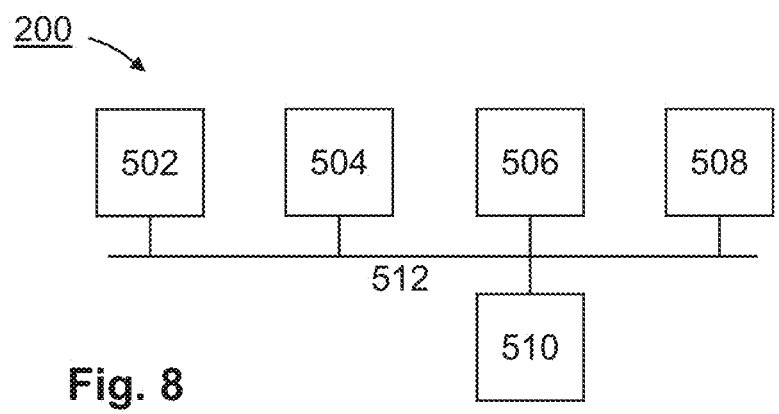
FIG. 8 shows an exemplary block diagram of an apparatus configured for executing the method of transmitting in accordance with an aspect of the invention.

FIG. 8 shows an exemplary block diagram of a transmitter 200 in accordance with the second aspect of the invention configured for executing the method 400 of transmitting in accordance with the fourth aspect of the invention. The transmitter 200 comprises a microprocessor 220, a volatile memory 222, a non-volatile memory 224, and a communication interface 226 for transmitting to a receiver 300 via an antenna 206. The aforementioned elements are communicatively connected via at least one data connection or bus 228. The non-volatile memory 224 stores computer program instructions which, when executed by the microprocessor 220, cause the receiver 200 to execute the method 400 in accordance with the fourth aspect of the present invention as presented above. It is noted that one or more of the various function blocks of the transmitter described with reference to FIG. 1, e.g., the first transmitter-side transformation unit 202 and the second transmitter-side transformation unit 204, may be fully or partially be implemented in software executed by the microprocessor 220.

Figure 9:
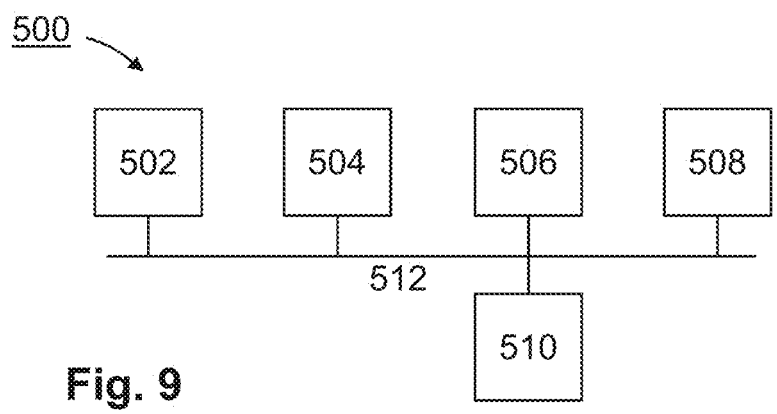
FIG. 9 shows an exemplary block diagram of an apparatus configured for executing the method of receiving in accordance with an aspect of the invention.

FIG. 9 shows an exemplary block diagram of a receiver 300 in accordance with the third aspect of the invention configured for executing the method 500 of receiving in accordance with the fifth aspect of the invention. The receiver 300 comprises a microprocessor 330, a volatile memory 332, a non-volatile memory 334, and a communication interface 336 for receiving from a transmitter via an antenna 302. The aforementioned elements are communicatively connected via at least one data connection or bus 338. The non-volatile memory 334 stores computer program instructions which, when executed by the microprocessor 330, cause the receiver 300 to execute the method 500 in accordance with the fifth aspect of the present invention as presented above. It is noted that one or more of the various function blocks of the transmitter described with reference to FIG. 1, e.g., the first receiver-side transformation unit 304, the second receiver-side transformation unit 306, the OFO estimation 312, the first channel estimation unit 321, the second channel estimation unit 322, the pilot removal 324 and the symbol estimation and detection in the equalizer unit 326 may be fully or partially be implemented in software executed by the microprocessor 330.

DEFINITIONS AND LIST OF REFERENCE NUMERALS (PART OF THE DESCRIPTION)

$f_c$ carrier frequency
$\Delta f$ subcarrier spacing
L channel length
M number of delay bins of the communication frame
N number of Doppler bins of the communication frame
$P_T$ total transmission power
$\alpha$ pilot power allocation ratio
$Q$s BEM order in the initial channel estimation
$Q$L BEM order in the subsequent, iterative channel estimation
AWGN additive white Gaussian noise
BEM basis expansion model
CE-BEM complex exponential BEM
GCE-BEM generalized CE-BEM
DFT discrete Fourier transform
KL-BEM Karhunen-Loeve BEM
MSE mean square error OTFS orthogonal time frequency space
SNR signal-to-noise-ratio
BER bit error rate
OFDM orthogonal frequency division multiplexing
MP message passing
SFFT symplectic finite Fourier transform
200 transmitter
202 first transmitter-side transformation unit
204 second transmitter-side transformation unit
206 antenna
220 microprocessor
222 volatile memory
224 non-volatile memory
226 communication interface
228 data connection/bus
300 receiver
302 antenna
304 first receiver-side transformation unit
306 second receiver-side transformation unit
310 channel estimation and equalisation block
312 OFO estimator
314 low-rate block extraction
316 auto correlation
318 OFO extraction
319 OFO-included BEM bases generation
320 two-stage CE and EQ
321 first channel estimation unit
322 second channel estimation unit
324 pilot removal unit
326 equalizer unit
330 microprocessor
332 volatile memory
334 non-volatile memory
336 communication interface
338 data connection/bus
500 method of receiving
502 receive continuous time-domain signal
504 transform continuous time-domain signal into a two-dimensional arrangement of information symbols in the time-frequency domain
506 transform a two-dimensional arrangement of information symbols in the time-frequency domain into a two-dimensional communication frame in the delay-Doppler domain
508 estimate OFO
510 provide OFO estimation to channel estimation
512 initial channel estimation
514 remove pilots
516 estimate symbols in equalizer unit
518 termination criterion met?
522 output most recent estimation to de-mapper
520 estimate channel in second channel estimation unit
524 receive BEM order used in transmitter
526 determine BEM order to be used in receiver
528 provide BEM order to channel estimation

The invention claimed is:

1. A receiver for an orthogonal time frequency space (OTFS) transmission system comprising:
a first receiver-side transformation unit;
a second receiver-side transformation unit;
an Oscillator Frequency Offset (OFO) estimator unit; and
an iterative two-stage channel estimation and equalization unit,
wherein the receiver is adapted to receive a time-domain signal representing a communication frame including at least two first-type blocks and at least one second-type block, wherein at least the two or more first-type blocks comprise data signals two-dimensionally arranged along the delay domain and the Doppler domain of which at least one has a superimposed pilot signal,
wherein the one or more second-type blocks comprise data signals two-dimensionally arranged along the delay domain and the Doppler domain or data signals two-dimensionally arranged along the delay domain and the Doppler domain of which at least one has a superimposed pilot signal, wherein one second-type block or a succession of second-type blocks is preceded and followed, in the delay-domain, by first-type blocks, the first-type blocks preceding and following the one second-type block or the succession of second-type blocks having at least one identical data symbol and associated superimposed identical pilot symbol at an identical location in the two-dimensional arrangement, the time-domain signal being transmitted over a communication channel and received at an input of the first receiver-side transformation unit, which outputs a two-dimensional representation of the received communication frame in the time-frequency domain, and wherein the output of the first receiver-side transformation unit is provided to an input of the second receiver-side transformation unit, which outputs a two-dimensional representation of the received communication frame comprising pilot and data signals in the delay-Doppler domain, wherein the Oscillator Frequency Offset (OFO) estimator unit is configured for performing an initial OFO estimation and compensation using symbols carried in the first-type block of the received communication frame, and the iterative two-stage channel estimation and equalization unit is configured for determining a residual OFO and performing a channel estimation using all symbols of the received communication frame.

2. The receiver of claim 1, wherein the OFO estimator unit is configured to perform an auto-correlation on the received OTFS symbols carried in the first-type block of the received communication frame, and wherein the initial OFO estimate is provided to the iterative two-stage channel estimation and equalization unit.

3. The receiver of claim 1, wherein the iterative two-stage channel estimation and equalization unit is configured for implementing an initial channel estimation followed by an initial equalization and symbol estimation, and further configured for implementing an iterative channel estimation followed by respective equalization and symbol estimation, for the joint estimation of the remaining OFO and the channel.

4. The receiver of claim 3, configured to provide at least the pilot signals output from the second receiver-side transformation unit to a first channel estimation unit, which outputs an initial estimation of the time-domain channel matrix, wherein the initial estimation of the time-domain channel matrix, as well as at least the data signals output from the second receiver-side transformation unit or the pilot and data signals output from the second receiver-side transformation unit, are provided to an equalizer, which outputs an estimated set of at least data signals, wherein the estimated set of at least data signals, as well as at least the pilot signals output from the second receiver-side transformation unit or the pilot and data signals output from the second receiver-side transformation unit, are provided to a second channel estimation unit, which outputs a second estimation of the time-domain channel matrix, wherein the output of the second channel estimation unit, as well as at least the data signals output from the second receiver-side transformation unit or the pilot and data signals output from the second receiver-side transformation unit, are provided to the equalizer, which outputs a further estimated set of at least data signals, wherein the receiver is adapted to iteratively repeat the channel estimation in the second channel estimation unit and estimating an estimated set of at least data signals in the equalizer until a termination criterion is met.

5. The receiver of claim 4, wherein the first channel estimation unit is adapted to perform a channel estimation based on a basis expansion modelling of a first Basis Expansion Modelling (BEM) order of the time-varying communication channel.

6. The receiver of claim 4, wherein the second channel estimation unit is adapted to perform a channel estimation based on a basis expansion modelling of a second Basis Expansion Modelling (BEM) order of a time-varying communication channel.

7. The receiver of claim 1, wherein the first receiver-side transformation unit is adapted to perform a finite Fourier transform, an inverse Heisenberg- or Wigner-transform and/or wherein the second receiver-side transformation unit is adapted to perform a decoding and/or a symplectic finite Fourier transform.

8. The receiver of claim 1, wherein an equalizer of the iterative two-stage channel estimation and equalization unit is configured for implementing a message passing, a zero-forcing and/or a minimum mean square error equalization.

9. The receiver of claim 1, further comprising a control unit that is adapted to receive information about the absolute speed and direction of the receiver over ground, the absolute speed and direction of a transmitter over ground and/or the relative speed between the receiver and the transmitter, and is further adapted to determine a Basis Expansion Modelling (BEM) order, and/or is adapted to receive the BEM order used at the transmitter for composing the communication frame, and is adapted to pass the received information and/or the BEM order to first and/or second channel estimation units of the iterative two-stage channel estimation and equalization unit.

10. A wireless device for an OTFS transmission system comprising a receiver according to claim 1.

11. A method of receiving a binary data sequence over an orthogonal time frequency space (OTFS) communication channel susceptive to doubly-selective fading, comprising:

receiving a continuous time-domain signal representing a communication frame including at least two first-type blocks and at least one second-type block, wherein at least the two or more first-type blocks comprise data signals two-dimensionally arranged along the delay domain and the Doppler domain of which at least one has a superimposed pilot signal, wherein the one or more second-type blocks comprise data signals two-dimensionally arranged along the delay domain and the Doppler domain or data signals two-dimensionally arranged along the delay domain and the Doppler domain of which at least one has a superimposed pilot signal, wherein one second-type block or a succession of second-type blocks is preceded and followed, in the delay-domain, by first-type blocks, the first-type blocks preceding and following the one second-type block or the succession of second-type blocks having at least one identical data symbol and associated superimposed identical pilot symbol at an identical location in the two-dimensional arrangement, the time-domain signal being received over the OTFS communication channel, transforming, in a first receiver-side transformation unit, the continuous time-domain signal representing the communication frame into a two-dimensional arrangement of information symbols in the time-frequency domain that is available at an output of the first receiver-side transformation unit, transforming, in a second receiver-side transformation unit, the two-dimensional arrangement of information symbols comprising pilot and data signals in the time-frequency domain into a two-dimensional communication frame comprising pilot signals and data signals in the delay-Doppler domain that is available at an output of the second receiver-side transformation unit, estimating an OFO from the first-type blocks of the communication frame, providing the estimated OFO to a channel estimation (CE) unit, for incorporating the OFO estimate into the CE function applied, providing the first-type blocks or the first-type blocks and the second-type blocks output from the second receiver-side transformation unit to a first channel estimation unit, for obtaining a first estimation of the time-domain channel matrix at an output of the first channel estimation unit, removing the pilot symbols from the received communication frame, using the first estimation of the time-domain channel matrix, providing the communication frame with the superimposed pilot symbols removed as well as the first estimation of the time-domain channel matrix, to an equalizer, for obtaining an estimated set of at least data signals at an output of the equalizer, estimating, in a second channel estimation unit, an estimation of the time-domain channel matrix, from the first-type block and the second-type block, as well as from the estimated set of at least data signals that are most recently output from the equalizer unit, providing the estimation of the time-domain channel matrix available at an output of the second channel estimation unit, as well as the first-type blocks and second-type blocks output from the second receiver-side transformation unit to the pilot removal, removing the pilot symbols from the received communication frame, using the estimation of the time-domain channel matrix available at an output of the second channel estimation unit, providing the communication frame with the superimposed pilot symbols removed as well as the estimation of the time-domain channel matrix available at an output of the second channel estimation unit, to the equalizer, for obtaining a further estimated set of at least data signals at an output of the equalizer, and iteratively repeating estimating the time-domain channel matrix in the second channel estimation unit, removing the pilot symbols, and estimating sets of at least data signals in the equalizer until a termination criterion is met.

12. The method of claim 11, wherein transforming, in the first receiver-side transformation unit, comprises subjecting the continuous time-domain signal representing a communication frame to a finite Fourier transform, an inverse Heisenberg, or Wigner-transform and/or wherein transforming, in the second receiver-side transformation unit, comprises subjecting the two-dimensional arrangement of information symbols comprising pilot and data signals in the time-frequency domain to a symplectic finite Fourier transform.

13. The method of claim 11, wherein estimating the OFO from the first-type blocks of the communication frame comprises:
- separating the first-type blocks from the received communication frame
- performing an autocorrelation on at least on the superimposed pilot symbols contained therein, and
- extracting the OFO information from the autocorrelation.

14. The method of claim 11, wherein obtaining the first estimation of the time-domain channel matrix in the first channel estimation unit comprises performing a channel estimation based on a basis expansion modelling of a time-varying communication channel of a first Basis Expansion (BEM) order.

15. The method of claim 11, wherein estimating estimations of the time-domain channel matrix in the second channel estimation unit comprises performing a channel estimation based on a basis expansion modelling of a time-varying communication channel of a second Basis Expansion Modelling (BEM) order.

16. The method of claim 11, wherein obtaining an estimated set of at least data signals in the equalizer comprises subjecting at least the data signals to a message passing, a zero-forcing and/or a minimum mean square error equalization.

17. The method of claim 11, further comprising:
- receiving, in a control unit, information about the absolute speed and direction of the receiver over ground, the absolute speed and direction of the transmitter over ground and/or the relative speed between the receiver and the transmitter, and/or the BEM order used at the transmitter for composing the communication frame,
- determining the respective BEM order to be used in the first and/or in the second channel estimation unit, and
- providing the respective determined BEM order to the first and/or to the second channel estimation unit.

18. A non-transitory computer readable medium storing computer program instructions which, when executed by a microprocessor cause a computer and/or control hardware components of a receiver of an orthogonal time frequency space (OTFS) transmission system to execute the method of claim 11.

* * * * *